(12) United States Patent
Romeo et al.

(10) Patent No.: US 12,170,378 B2
(45) Date of Patent: Dec. 17, 2024

(54) MANUFACTURE OF PASTED CURRENT COLLECTORS FOR BIPOLAR BATTERIES

(71) Applicant: Wirtz Manufacturing Company, Inc., Port Huron, MI (US)

(72) Inventors: Michael R. Romeo, St. Clair, MI (US); Jason P. Miller, Cottrellville, MI (US); Edward F. Wood, Metamora, MI (US)

(73) Assignee: Wirtz Manufacturing Company, Inc., Port Huron, MI (US)

( * ) Notice: Subject to any disclaimer, the term of this patent is extended or adjusted under 35 U.S.C. 154(b) by 338 days.

(21) Appl. No.: 17/698,219

(22) Filed: Mar. 18, 2022

(65) Prior Publication Data
US 2022/0302464 A1 Sep. 22, 2022

Related U.S. Application Data

(60) Provisional application No. 63/162,657, filed on Mar. 18, 2021.

(51) Int. Cl.
*H01M 4/82* (2006.01)
*H01M 4/02* (2006.01)
*H01M 10/18* (2006.01)

(52) U.S. Cl.
CPC ............ *H01M 4/82* (2013.01); *H01M 10/18* (2013.01); *H01M 2004/029* (2013.01)

(58) Field of Classification Search
CPC .................................................... H01M 4/82
USPC ....... 156/60, 73.1, 73.3, 196, 199, 204, 221, 156/222, 226, 227, 250, 252, 269, 297, 156/299; 429/210; 29/623.1, 623.3, 29/623.4
See application file for complete search history.

(56) References Cited

U.S. PATENT DOCUMENTS

| | | | |
|---|---|---|---|
| 9,397,331 B2 | 7/2016 | Mendoza et al. | |
| 10,232,453 B2 | 3/2019 | Mendoza et al. | |
| 2017/0341163 A1 | 11/2017 | Mendoza et al. | |
| 2018/0221908 A1 | 8/2018 | Enokihara et al. | |
| 2018/0366719 A1 | 12/2018 | Abrahamson et al. | |

FOREIGN PATENT DOCUMENTS

| | | |
|---|---|---|
| EP | 0414118 A1 | 2/1991 |
| WO | WO2019236542 A1 | 12/2019 |

OTHER PUBLICATIONS

International Search Report and Written Opinion for International Application No. PCT/US22/20896 dated Jul. 7, 2022 (15 pages).
International Preliminary Report On Patentability for International Application No. PCT/US2022/20896 dated Sep. 12, 2023 (7 pages).

*Primary Examiner* — Philip C Tucker
*Assistant Examiner* — Brian R Slawski
(74) *Attorney, Agent, or Firm* — REISING ETHINGTON, P.C.

(57) ABSTRACT

In the manufacture of pasted current collectors for bipolar batteries, a method of making pasted substrates includes several steps. The substrates can be a plastic sheet, an embedded plastic mesh, a metal mesh, an absorbent glass mat (AGM), or some other material. One step involves applying paste material to an elongate strip of substrate material. Another step involves cutting the elongate strip of substrate material into multiple individual substrates. Further steps can involve punching via a rotary punch, crush cutting, ultrasonic cutting, concealing lateral sections via folding, and/or using one or more mask overlays.

20 Claims, 21 Drawing Sheets

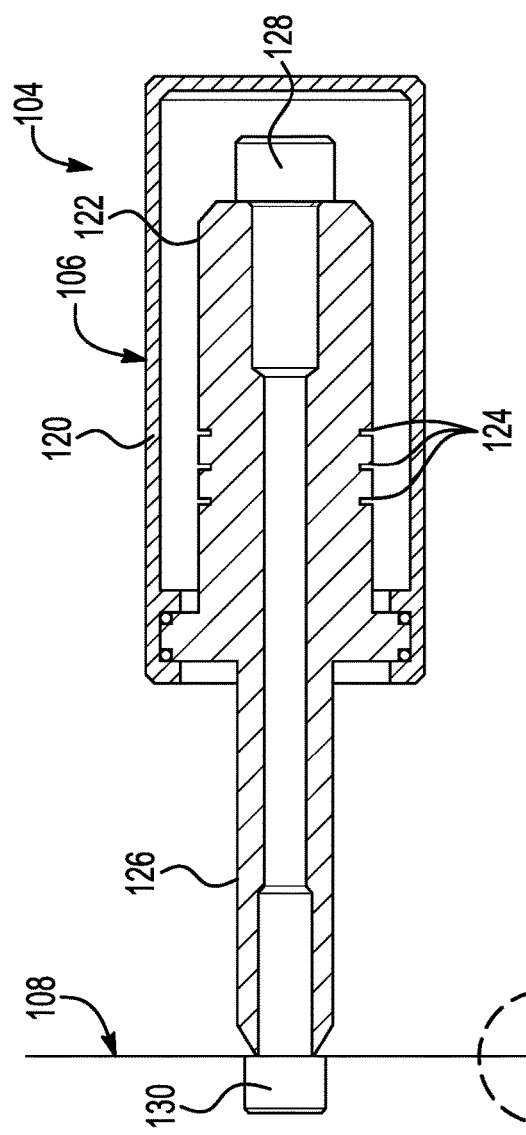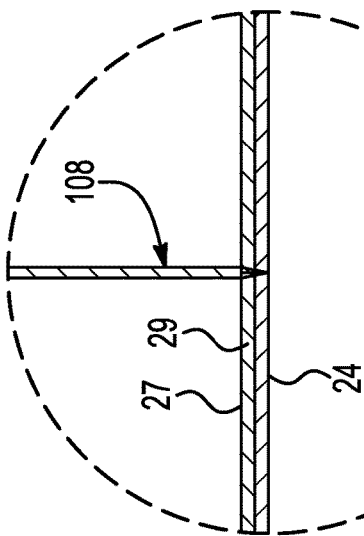

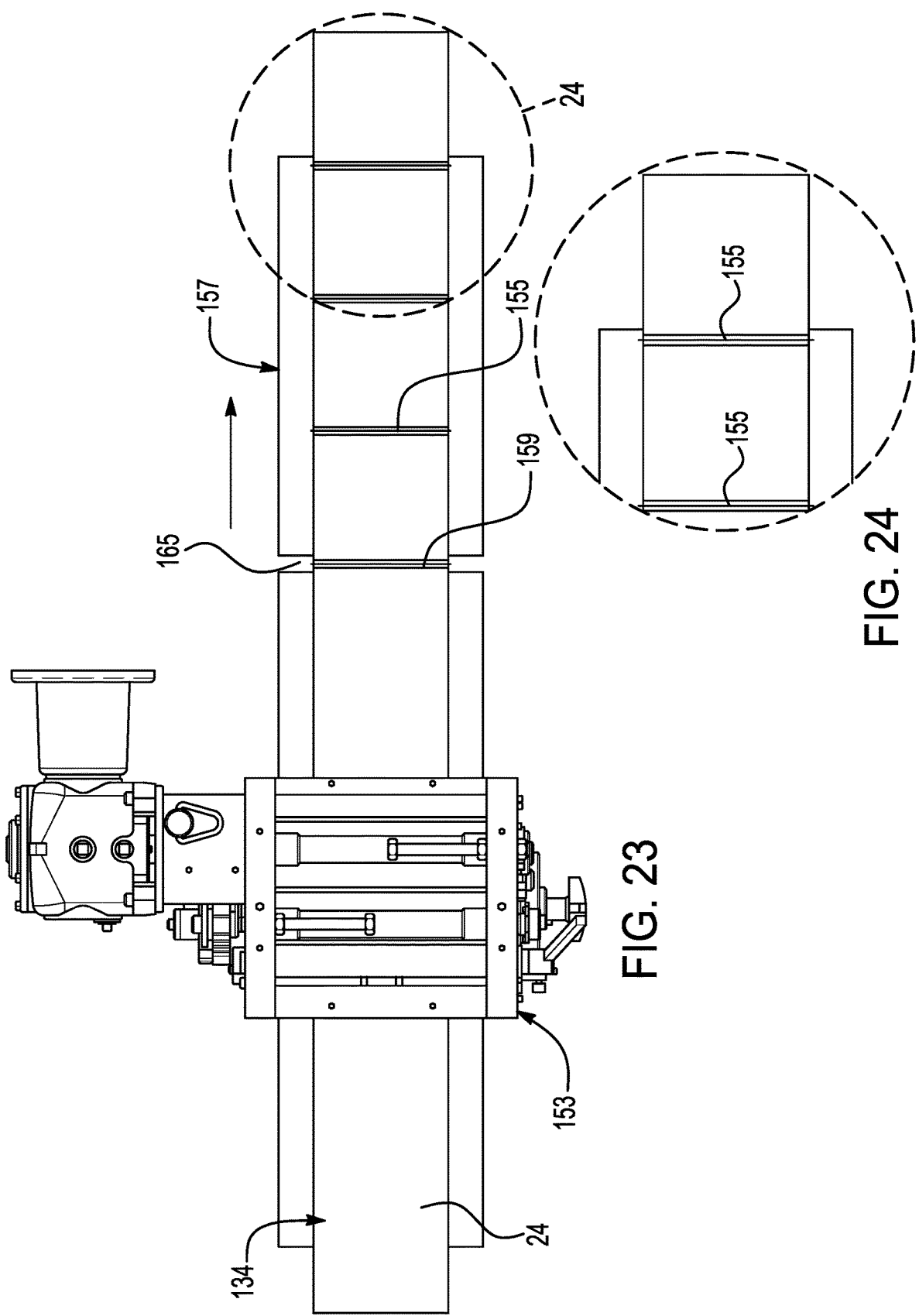

MANUFACTURE OF PASTED CURRENT COLLECTORS FOR BIPOLAR BATTERIES

CROSS-REFERENCE TO RELATED APPLICATION

This application claims the benefit of U.S. Provisional Patent Application No. 63/162,657, with a filing date of Mar. 18, 2021, the contents of which are hereby incorporated by reference in their entirety.

TECHNICAL FIELD

This disclosure relates generally to the manufacture of bipolar batteries, and relates more particularly to the manufacture of pasted current collectors for assembly in bipolar batteries.

BACKGROUND

Batteries with bipolar architectures can be used for automotive, traction, and stationary applications, as well as any other platform that utilizes lead-acid battery technology as its primary energy storage means. Compared to prismatic lead-acid batteries, bipolar batteries generally offer reductions in manufacturing cost, product weight, and recharge time, while providing increased duty cycle and battery longevity. Bipolar battery architecture is chemistry agnostic, but most state-of-the-art bipolar batteries are of the lead-acid type.

Bipolar batteries have individual electrochemical cell compartments that are isolated by current collectors and are arranged electrically in series. Current flows perpendicular relative to a surface of the current collectors, in contrast to the more traditional prismatic architectures, for example, in which current flows parallel relative to a surface of the associated electrode. Each current collector—also called a bipole—has positive electrochemically active material situated on one of its sides, and has negative electrochemically active material situated on its other, opposite side.

The individual electrochemical cell compartments established on either side of the current collectors in a bipolar battery architecture should be electrolytically isolated from one another for proper functionality. Past efforts at isolation have involved preparing a clean perimeter around a current collector, free of active material and of any contaminants, and forming a seal around the perimeter. Plastic injection overmolding, adhesives, and o-rings have been used to form the seal. Further, secondary carriers have been introduced to accept pasting of the active material and for eventual placement on current collectors in order to ease preparation of the clean perimeters, rather than application of the paste directly on the current collector itself. Example secondary carriers include a plastic sheet or mesh, pasting paper, and an absorbent glass mat (AGM). But previous approaches do not lend themselves to the mass production and continuous processes that are currently used in the industry for effective and efficient battery manufacture.

SUMMARY

In an embodiment, a method of making pasted substrates for use in bipolar batteries may include several steps. One step may involve applying paste material to an elongate strip of substrate material. Another step may involve cutting the elongate strip of substrate material into multiple individual substrates. Yet another step may involve placing current collector bodies on the pasted substrates downstream of the step of applying paste material to the elongate strip of substrate material. Placing current collector bodies on the pasted substrates may occur while the paste material remains in a wet state.

In an embodiment, a method of making pasted substrates for use in bipolar batteries may include several steps. One step may involve applying paste material to an elongate strip of substrate material. Another step may involve ultrasonic cutting the elongate strip of substrate material at the applied paste material. The ultrasonic cutting may occur while the paste material remains in a wet state. The ultrasonic cutting may utilize an ultrasonic cutter assembly having a blade. The blade severs the elongate strip of substrate material at the applied paste material while the paste material remains in the wet state. Yet another step may involve moving the blade during the ultrasonic cutting in a direction that is generally transverse to a longitudinal direction of movement of the elongate strip of substrate material. And concurrently this step may involve moving the blade in the longitudinal direction with the longitudinal movement of the elongate strip of substrate material during the ultrasonic cutting.

In an embodiment, a method of making pasted substrates for use in bipolar batteries may include several steps. One step may involve folding lateral sections of an elongate strip of substrate material. Another step may involve applying paste material to the elongate strip of substrate material. The folded lateral sections may be concealed from application of the paste material and hence may not receive application of the paste material. Yet another step may involve unfolding the folded lateral sections. And yet another step may involve cutting the elongate strip of substrate material at the unfolded lateral sections.

BRIEF DESCRIPTION OF THE DRAWINGS

The following detailed description of certain embodiments and best mode will be set forth with reference to the accompanying drawings, in which:

FIG. 16 is a sectional view of the ultrasonic cutter assembly;

FIG. 17 is an enlarged view of a blade of the ultrasonic cutter assembly;

FIG. 23 is a top view of a pasting assembly that can be employed with the pleating assembly;

FIG. 24 is an enlarged view taken at the circled section of FIG. 23;

DETAILED DESCRIPTION

The drawings present various embodiments of equipment and assemblies used to prepare, make, and put together pasted substrates and current collectors for bipolar battery manufacture (hereafter, bipolar batteries). Bipolar batteries, in general, are useful in automotive applications like hybrid vehicles, traction applications, and stationary applications, as well as many others. Described herein are equipment and assemblies that perform one or more of the following actions: apply active material in paste form on an elongate strip of substrate material, cut the elongate strip of substrate material into individual substrates, and place the individual pasted substrates together with individual current collectors. The equipment and assemblies disclosed provide clean perimeters around pasted current collectors in a way that is more efficient and more effective than past approaches, and that is intended for incorporation in a mass production process of manufacture, unlike the past approaches. The clean perimeters ready the pasted current collectors for subsequent sealing and electrolytic isolation in a bipolar battery. Furthermore, as used herein, longitudinal refers to a forward and rearward direction in which the elongate strip of substrate material is advanced amid application of paste material, transverse refers to a direction that is generally orthogonal to the longitudinal direction and can be a lateral side-to-side direction or a vertical up-and-down direction, downstream refers to a forward direction in which the substrate is advanced, and upstream refers to a rearward direction that is opposite the downstream direction.

Figure 1:
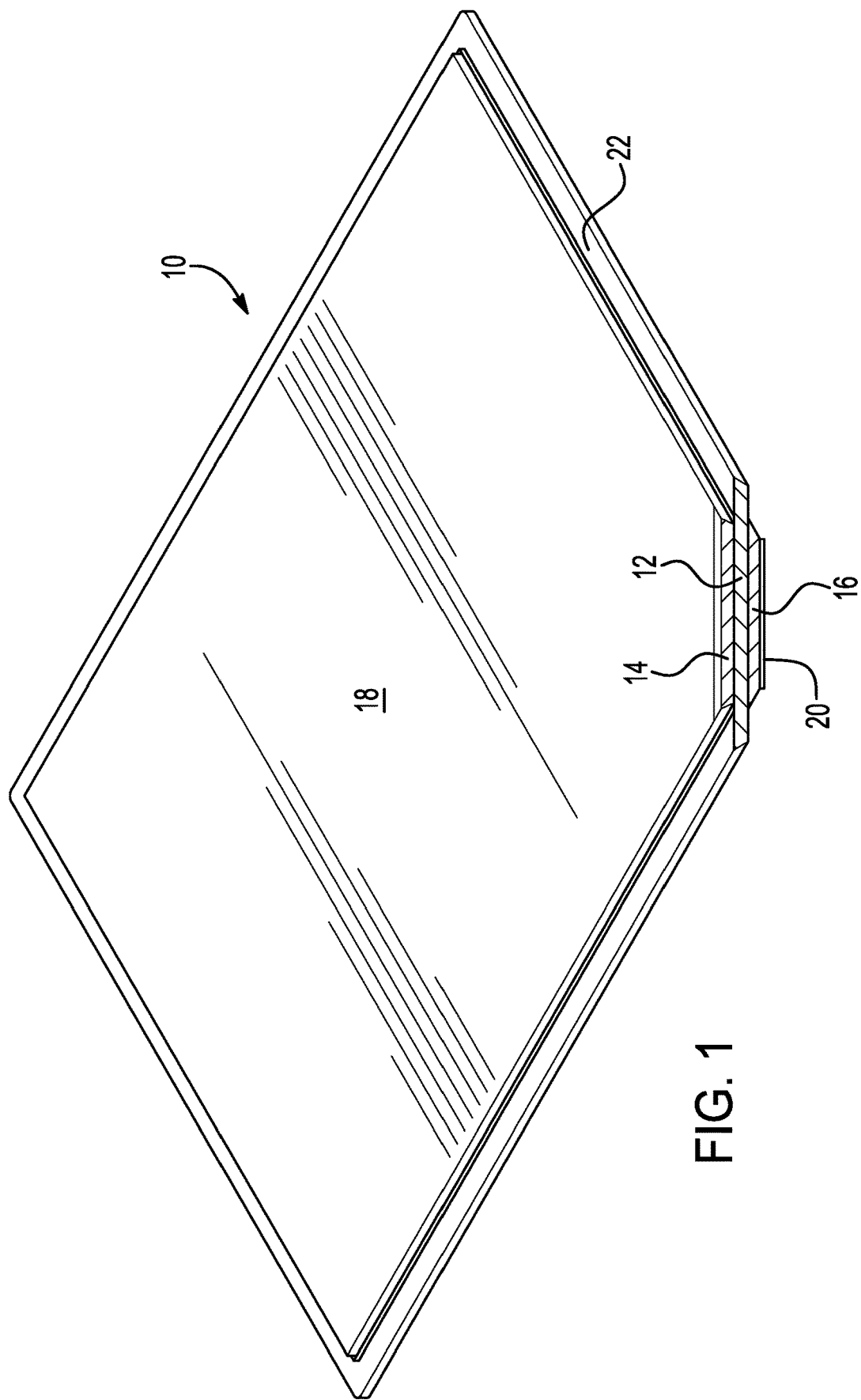
FIG. 1 is a perspective view of a current collector with positive and negative active material situated on opposite sides, and with substrates carrying the positive and negative active materials.

An example of a pasted current collector 10 is shown in FIG. 1. The pasted current collector 10 has a current collector body 12, positive active paste material 14 adhered on one side, and negative active paste material 16 situated on its other, opposite side. The current collector body 12 could be a silicon wafer plated with lead material in one example, or could have a main body of plastic that is coated with lead foil in another example; still, the current collector body 12 could have other constituents in other examples. A first substrate 18 supports and carries the positive active paste material 14, and a second substrate 20 supports and carries the negative active paste material 16. In this example, the first and second substrates 18, 20 are pasting paper material and constitute outermost surfaces of the pasted current collector 10. In other examples, the first and second substrates 18, 20 could be a plastic sheet, an embedded plastic mesh, a metal mesh, an absorbent glass mat (AGM), or something similar in kind. In the case of pasting paper material and AGM, these are components that already perform a useful role in electrochemical cell compartments of bipolar batteries, and hence make convenient substrates. Plastic sheet and plastic mesh, on the other hand, are inert materials that perform no useful role apart from supporting and carrying active paste material.

The first and second substrates 18, 20 are thinner than the active paste material carried thereon. In one non-limiting example, the first and second substrates 18, 20— in pasting paper form—may have a thickness that ranges between approximately 0.001 inches to 0.020 inches and may be approximately 0.003 inches (0.0762 millimeters (mm)), the positive active paste material 14 may have a thickness that ranges between approximately 0.020 inches to 0.110 inches and may be approximately 0.070 inches (1.778 mm), and the negative active paste material 16 may have a thickness that ranges between approximately 0.020 inches to 0.110 inches and may be approximately 0.055 inches (1.397 mm); still, in other examples these thicknesses could have other values. In order to establish a perimeter that is free of active paste material, the positive active paste material 14, negative active paste material 16, first substrate 18, and second substrate 20 have a reduced surface area with respect to the larger surface area of the current collector body 12 on which they are situated. A clean perimeter 22 hence spans fully around the pasted current collector 10, as illustrated in FIG. 1, for subsequent sealing and electrolytic isolation in a bipolar battery. In one non-limiting example, the clean perimeter 22 has a width that can range approximately between 0.075 inches and 0.5 inches, and may be approximately 0.2 inches; still, in other examples the width could have other values.

Figure 13:
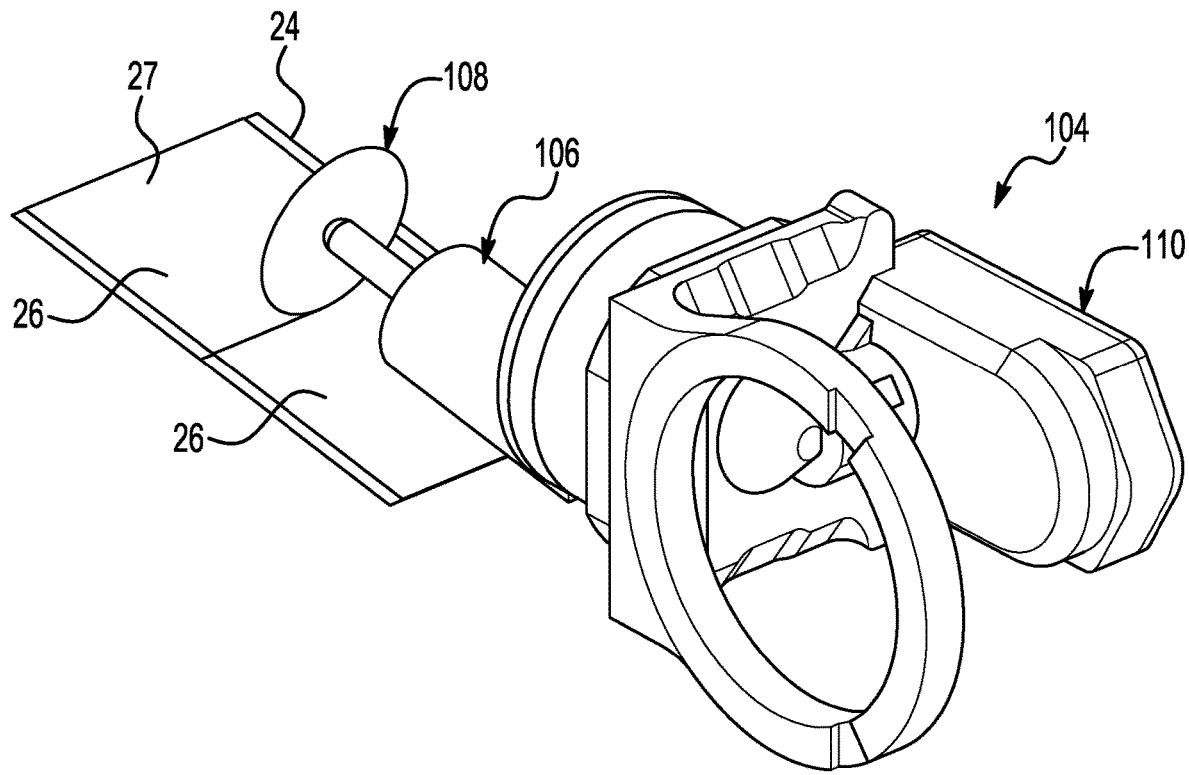
FIG. 13 is a perspective view of an embodiment of an ultrasonic cutter assembly.

The equipment and assemblies of the figures are employed in various methods to make the pasted current collector 10. Different embodiments of the methods carry out the steps of applying positive or negative active paste material to an elongate strip of substrate material 24 (hereafter "strip"), cutting the strip 24 into multiple individual substrates 26, and placing the individual substrates 26 together with the current collector bodies 12. The individual substrates 26 serve as the first and second substrates 18, 20. The steps can be performed in different ways and in different orders, depending on the embodiment. For optimum adherence and bonding between the active paste material and the current collector bodies 12, it has been found that the active paste material should substantially retain its original moisture content from the time of application to the strip 24 and until placement with the current collector bodies 12. This may be especially true of the positive active paste material 14. Lack of proper adhesion and absence of a mechanical bond has been shown to degrade bipolar battery impedance, cycle life, and overall performance. Accordingly, the current collector bodies 12 of the methods described herein are put in place and directly on the active paste material while the active paste material is in a wet or tacky state. Placement occurs before the active paste material is subjected to an active drying process which removes 1-2% of moisture content from the active paste material (if performed at all), such as a tunnel drying process in a tunnel drying oven that is not uncommon in other types of battery manufacture. Indeed, in some embodiments, placement occurs immediately after and downstream of the step of applying active paste material and/or immediately after and downstream of the step of cutting, and may occur without any intervening steps or processing. Still, in certain embodiments, in order to supplement the moisture content of the active paste material and help ensure proper adherence and bonding, water can be sprayed and misted directly on an exterior surface of the current collector bodies 12 before placement with the individual substrates 26 having the active paste material already applied thereon and in its wet state. Furthermore, because placement of the current collector bodies 12 occurs while the active paste material is in the wet state, a non-stick barrier material like pasting paper material is not overlayed on an exterior paste surface 27 (FIG. 13) of the applied active paste material. The non-stick barrier would obstruct the placement steps subsequently performed. Such barrier materials are not uncommon in other types of battery manufacture. As set forth below, the exterior surface 27 of the applied active paste material in certain embodiments is directly exposed and subjected to the cutting step.

Figure 3:
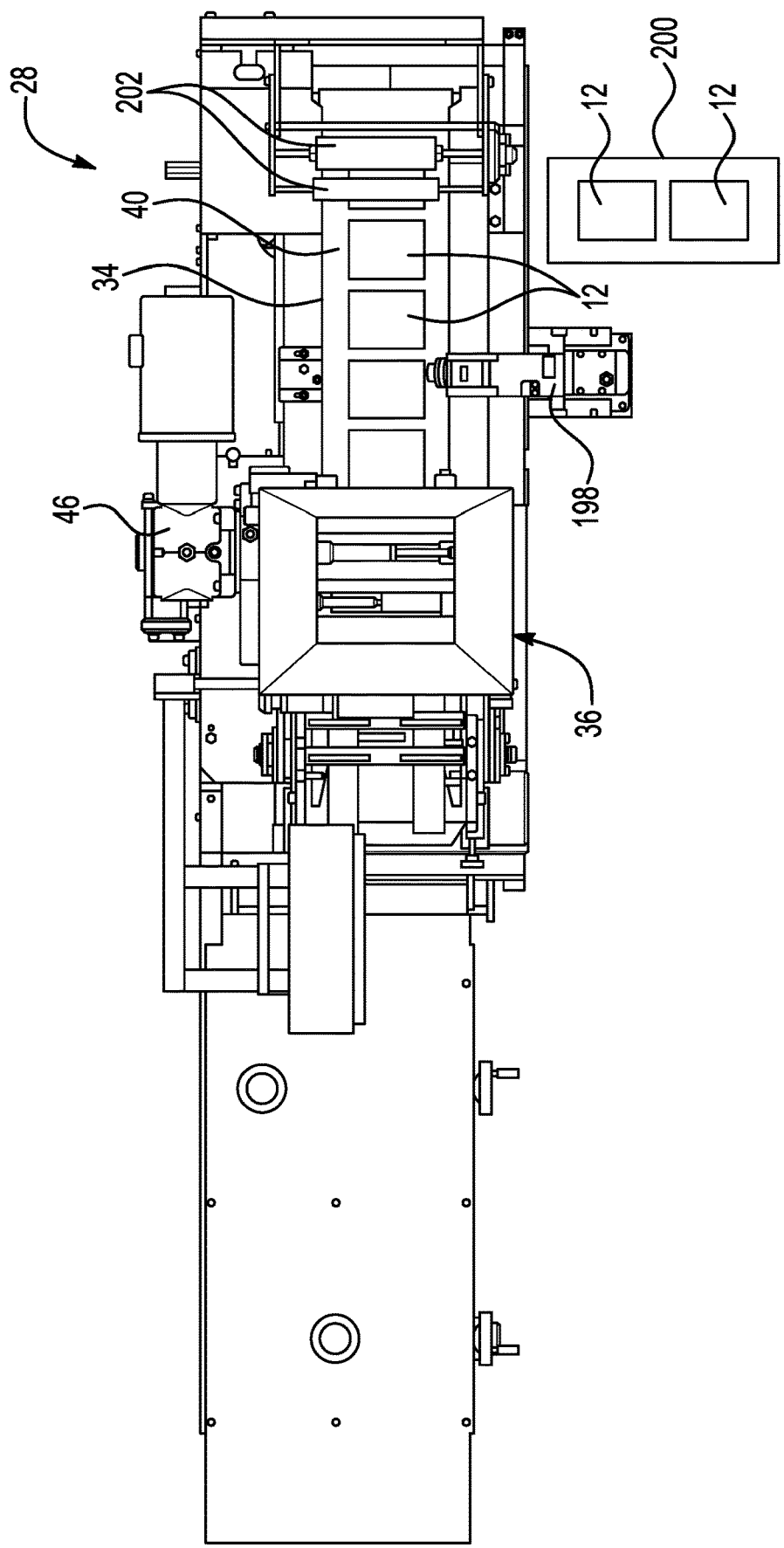
FIG. 3 is a top view of the equipment of FIG. 2.
Figure 4:
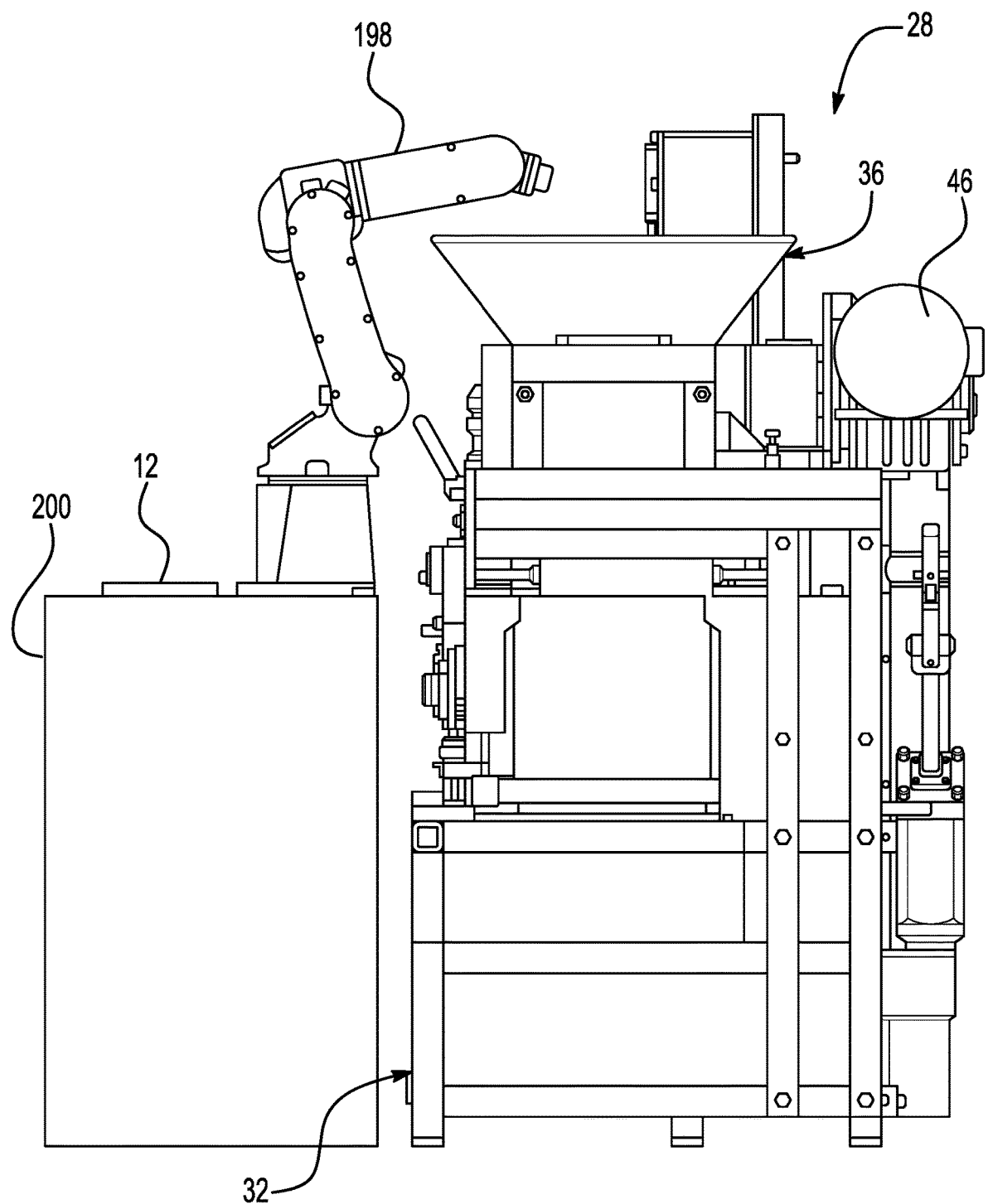
FIG. 4 is a front view of the equipment of FIG. 2.
Figure 5:
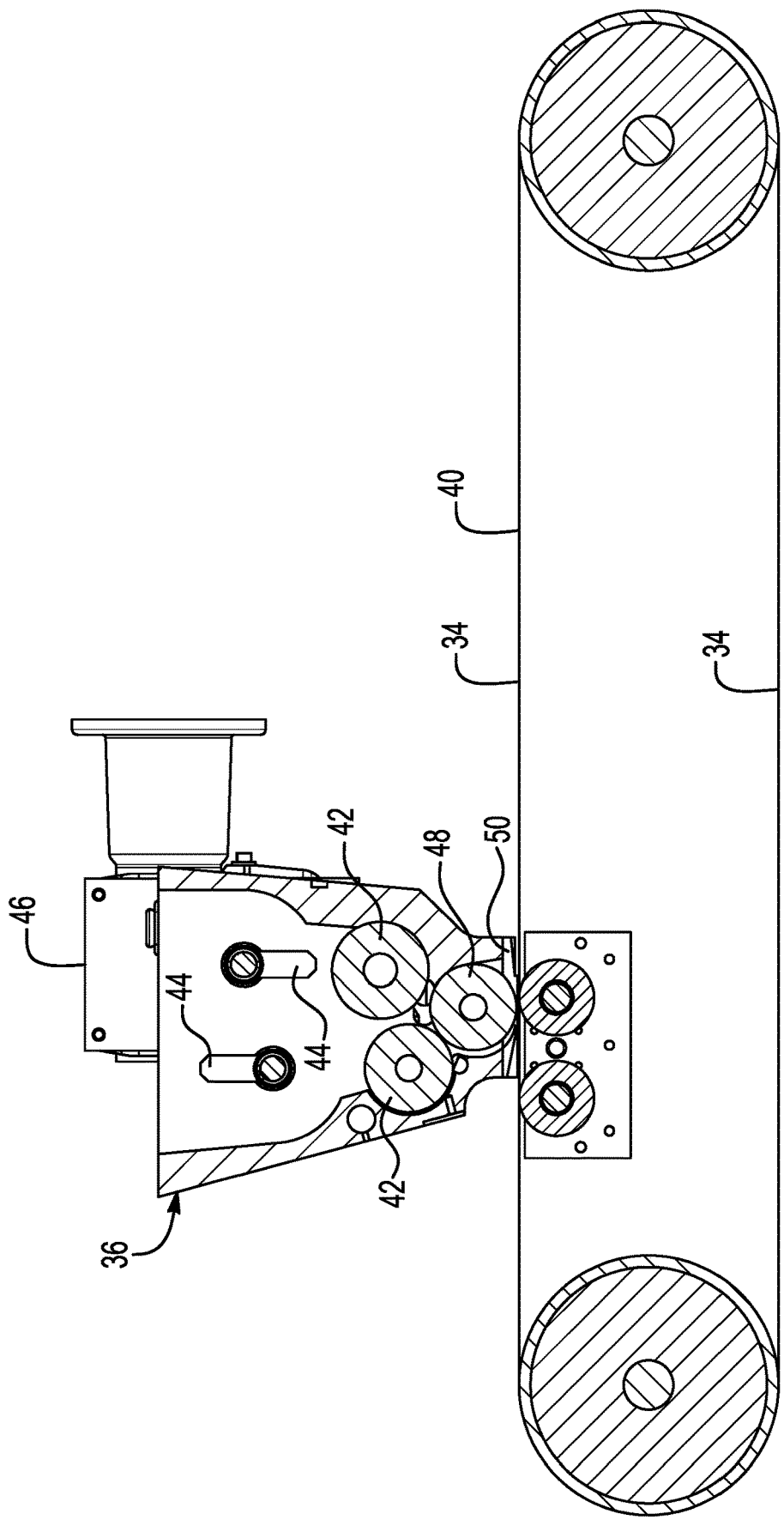
FIG. 5 is a sectional view of a belt pasting assembly of the equipment of FIG. 2, depicted with certain components absent for demonstrative purposes.

The step of applying positive or negative active paste material of desired thickness and width to the strip 24 can be performed in various ways in different embodiments. With reference to FIGS. 2-5, a pasting machine and assembly 28 of the belt pasting type is illustrated. The pasting assembly 28 applies active paste material in slurry form to the strip 24. In this embodiment, the strip 24—shown unwound in FIGS. 6 and 7 and elsewhere—is a continuous sheet of AGM. In general, this embodiment of the pasting assembly 28 includes a frame 32, a belt 34, and a paste hopper 36. The belt 34 conveys the strip 24 through the pasting assembly 28 from an entrance to an exit thereof. The belt 34 can be endless, and can be composed of metal, plastic, rubber, or cloth. Rollers support and propel movement of the belt 34, while a belt motor drives rotation of one or more of the rollers. An entrance guide assembly 38 feeds the strip 24 beneath the paste hopper 36. The paste hopper 36 is mounted above an upper run 40 of the belt 34, holds active paste material, and dispenses the active paste material directly to the strip 24 traveling below the paste hopper 36. With particular reference now to FIG. 5, in order to keep the active paste material mixing while contained in the paste hopper 36 and to generate pressure for extrusion through an orifice plate 50, internal rollers 42 and paddles 44 submerged in the active paste material at the paste hopper's interior are driven to rotate by a hopper motor 46. The hopper motor 46 also drives rotation of an internal paste delivery roller 48 mounted adjacent the orifice plate 50 of the paste hopper 36. The paste delivery roller 48 spurs dispensation of active paste material and is seated partially in a complementarily-shaped depression that resides in the orifice plate 50. An orifice slot spans wholly through the orifice plate 50 at the depression. The orifice plate 50 is mounted to a bottom of the paste hopper 36 and, with the exception of the orifice slot, closes the bottom. Active paste material is dispensed out of the paste hopper 36 and to the underlying strip 24 amid use via the orifice slot. Still, in other embodiments, belt pasting machines can have diverse designs, constructions, and components than those presented here.

Still, the step of applying active paste material to the strip 24 can be carried out with other equipment. Another example is presented in FIGS. 6 and 7. A pasting machine and assembly 52 of the drum pasting type applies active paste material in slurry form to the strip 24. While this embodiment of the pasting assembly 52 also performs a punching step, as subsequently described, it need not in certain embodiments and rather could be employed solely to apply active paste material and without the punching facilities. In general, the pasting assembly 52 includes a drum 54 and a paste hopper 56. The drum 54 conveys the strip 24 through the pasting assembly 52. The drum 54 is driven to rotate and resides underneath the paste hopper 56. As before, the paste hopper 56 holds active paste material and dispenses it directly to the strip 24 traveling therebelow. Internal rollers 58 and paddles 60 are driven by a hopper motor 62 (FIG. 7) to mix and apply pressure to the active paste material contained in the paste hopper 56. An internal paste delivery roller 64 is seated adjacent a slotted plate 66 that is mounted at a bottom of the paste hopper 56. Still, in other embodiments, drum pasting machines can have diverse designs, constructions, and components other than those presented here.

In these embodiments of applying active paste material, as well as others, the active paste material is dispensed immediately and directly to an upper surface 68 (FIG. 6) of the strip 24. Across a clearance, the upper surface 68 confronts the paste hopper's plate 66 from which active paste material is dispensed. When the strip 24 is composed of a material largely impervious to the active paste material, the applied active paste material will remain at the upper surface 68 and will not come into contact with the underlying belt 34 or drum 54 which are shielded by the substrate material. Materials of this nature may include pasting paper, plastic sheet, and AGM. The belt 34 and drum 54 remain generally clean and free of active paste material accumulation, and the strip 24 can be readily released from the belt 34 and drum 54 amid downstream processing.

When the strip 24, on the other hand, is composed of a material pervious to the active paste material, the applied active paste material may not remain at the upper surface 68 and instead can make its way to the underlying belt 34 or drum 54. Materials of this nature may include plastic mesh and metal mesh, and are suitable for maximizing the amount and volume of active paste material carried by the particular substrate and for furnishing a substrate with active paste material on both of its upper and lower surfaces. With the pervious materials, a supplemental barrier layer such as pasting paper can be disposed at the belt 34 or drum 54 beforehand to protect it from contact with the applied active paste material and prevent the pasted substrate from sticking to the belt 34 or drum 54. The barrier layer can be supplied from a paper roller system. To obviate the addition of this supplemental barrier layer, yet still use a pervious substrate for two-sided paste application, a pasting machine and assembly of the beltless type can be employed to apply active paste material to the strip 24, like that described in European patent application publication number EP0414118A1 by applicant Wirtz Manufacturing Company, Inc. with a filing date of Aug. 16, 1990.

Figure 6:
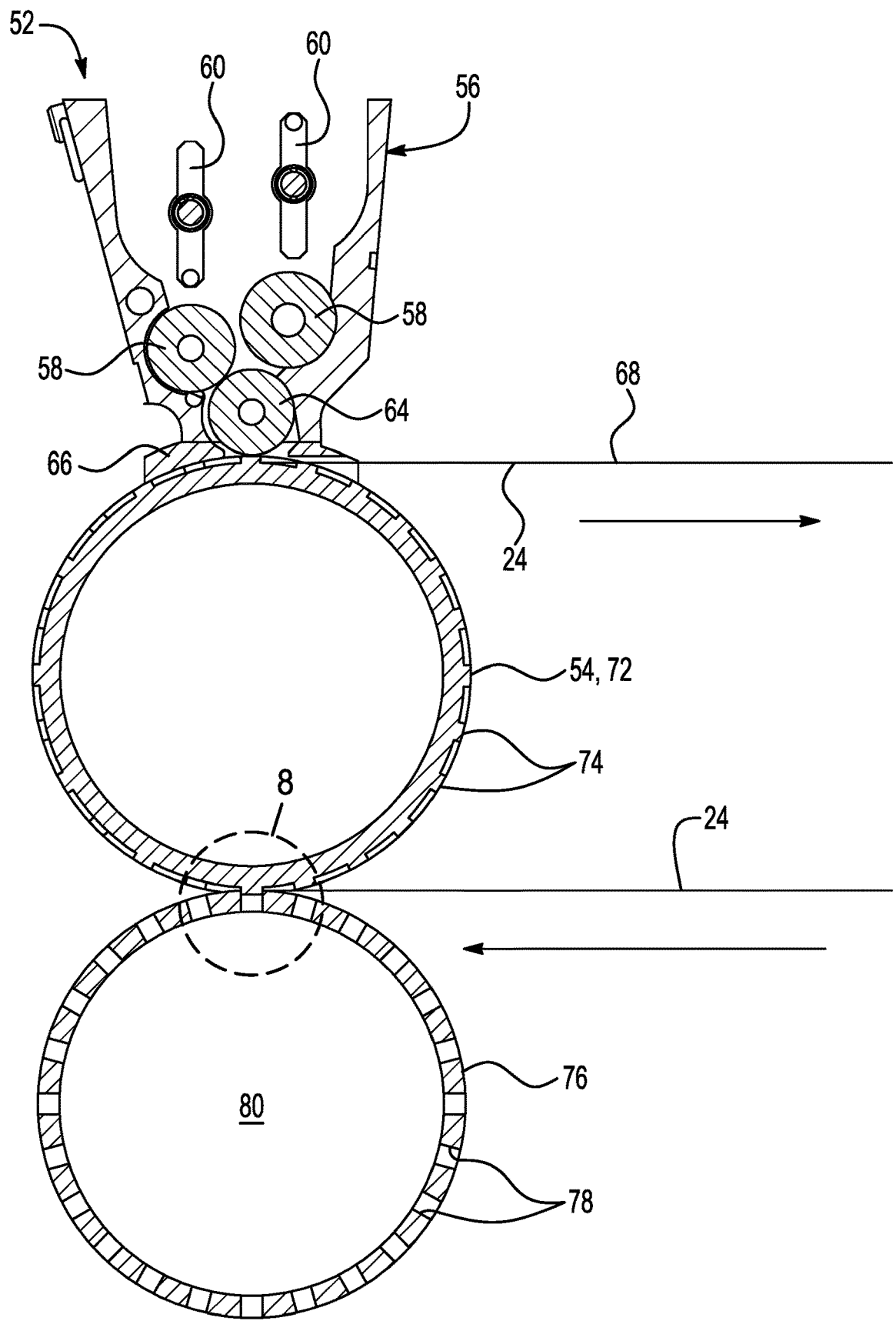
FIG. 6 is a sectional view of an embodiment of a rotary punch and pasting assembly.
Figure 7:
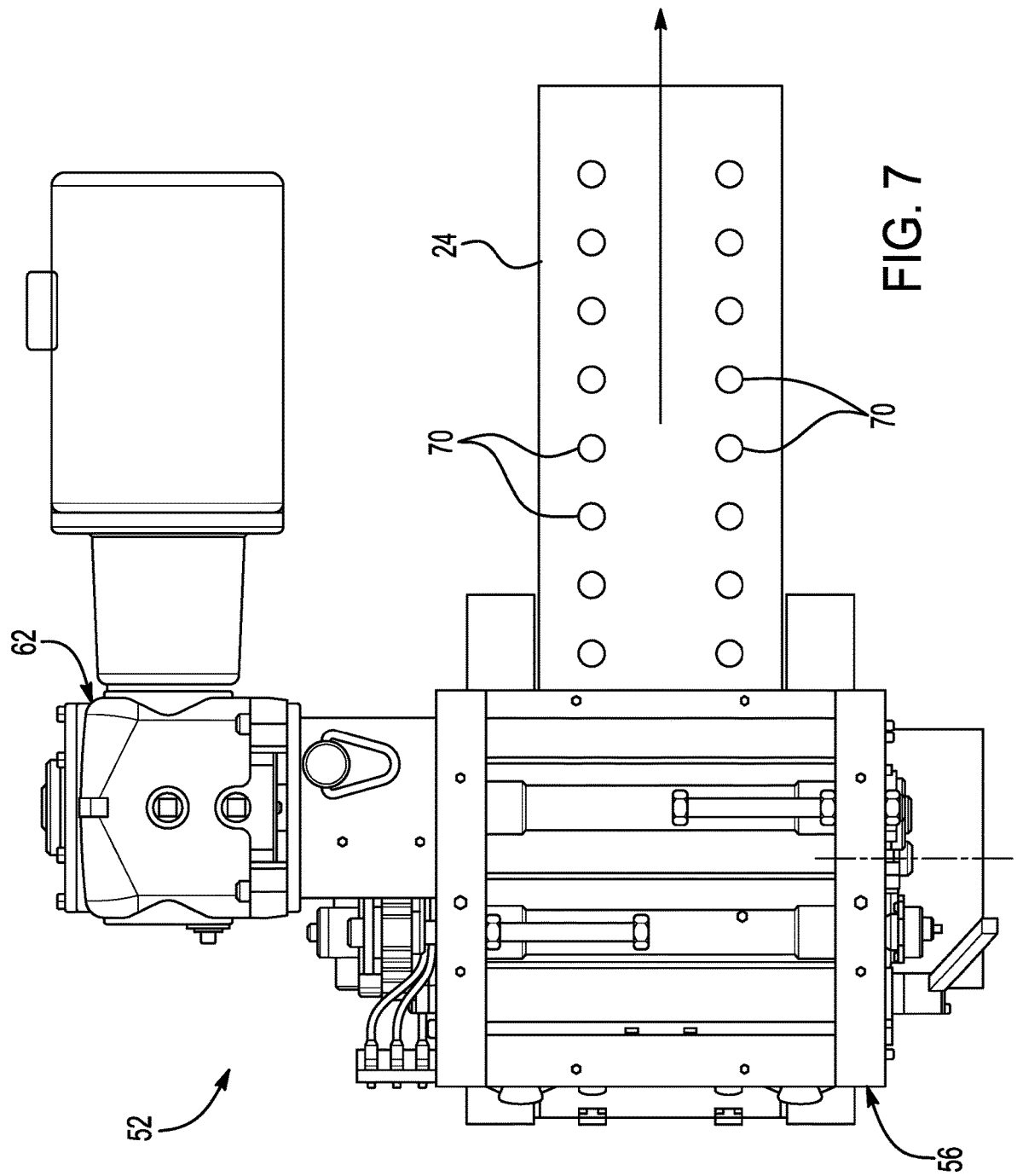
FIG. 7 is a top view of the rotary punch and pasting assembly.
Figure 8:
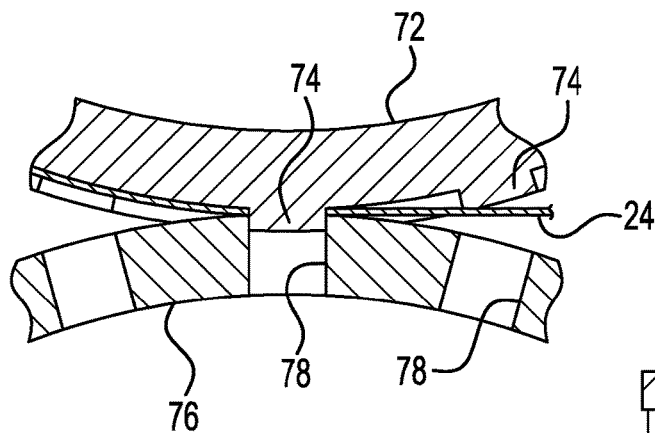
FIG. 8 is an enlarged view of the circled section of the rotary punch and pasting assembly in FIG. 6.
Figure 9:
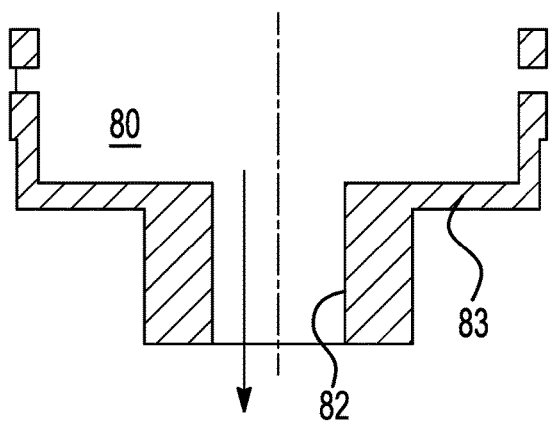
FIG. 9 is an enlarged sectional view of a slug escape of the rotary punch and pasting assembly.
Figure 10:
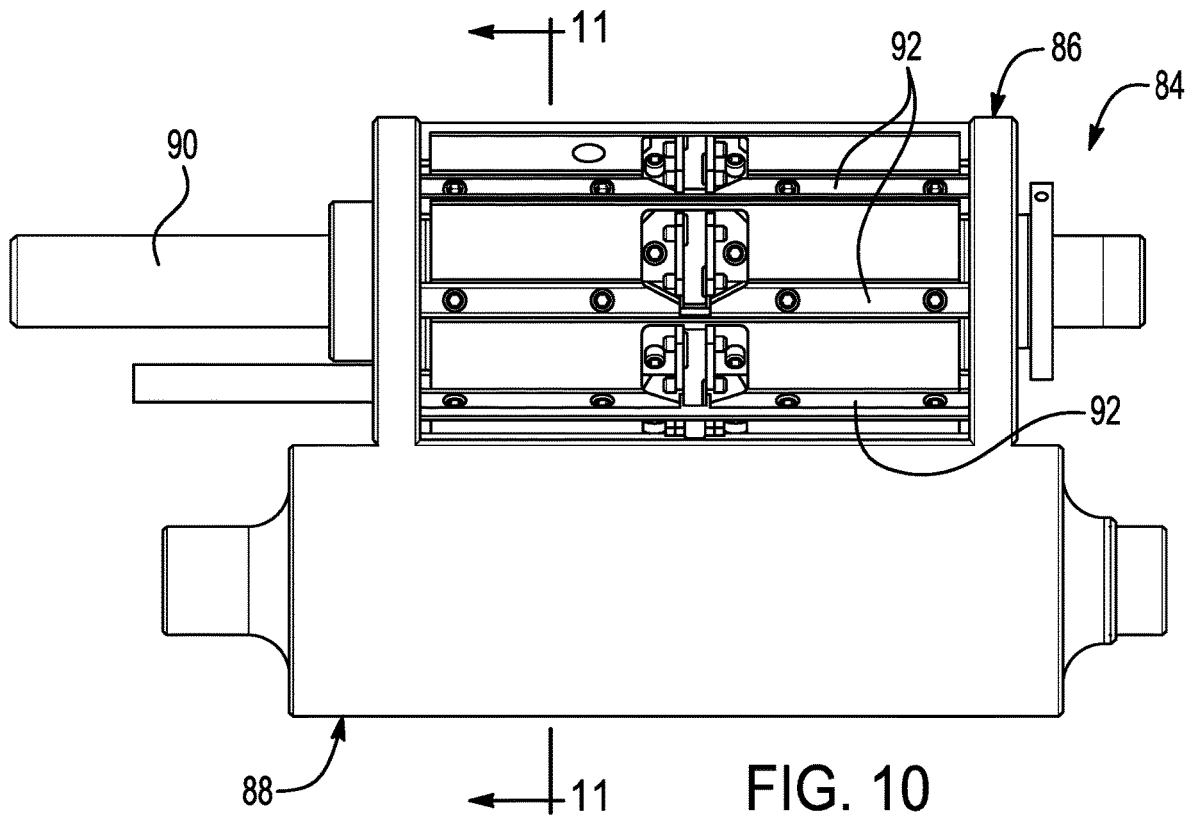
FIG. 10 is a front view of an embodiment of a crush cutter assembly.
Figure 11:
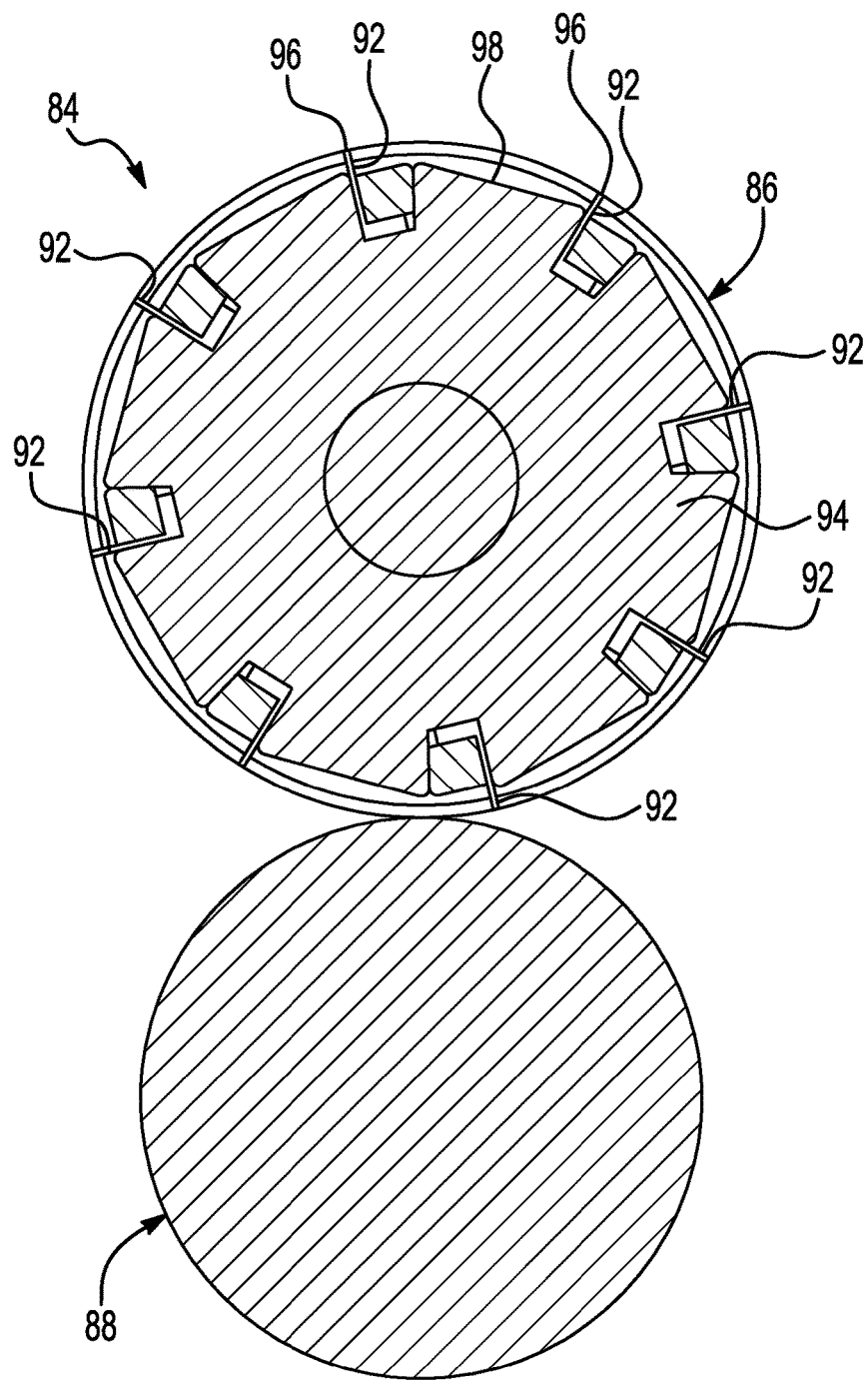
FIG. 11 is a sectional view of the crush cutter assembly.
Figure 12:
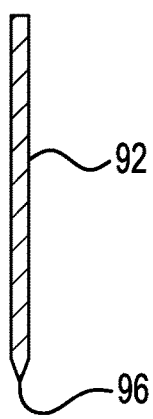
FIG. 12 is an enlarged, isolated view of a blade of the crush cutter assembly.
Figure 12A:
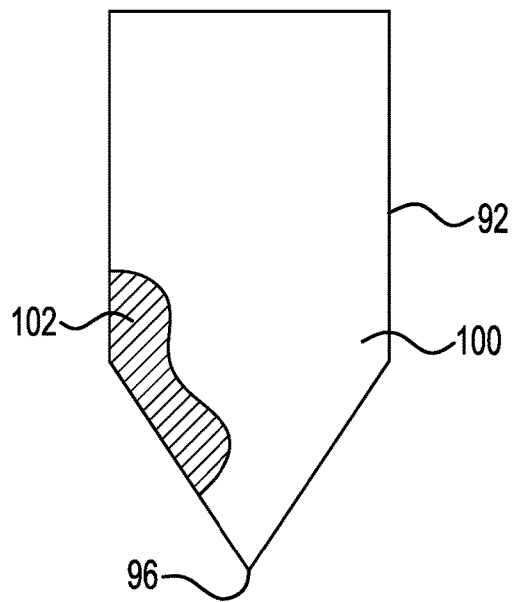
FIG. 12A is an enlarged view depicting a coating of the blade.

Certain bipolar batteries call for breaks in the active paste material based on the particular configuration of the bipolar batteries and their components. The breaks can be in various forms. In the example of FIGS. 6-9, the breaks are in the form of multiple throughholes that are patterned in rows and spaced equally from one another. Since the throughholes are called-for in the active paste material, the throughholes are concomitantly called-for in the strip 24. Throughholes 70 (FIG. 7) hence span wholly through the strip 24. The throughholes 70 can be produced in different ways. In the embodiment of FIGS. 6-9, the throughholes 70 are produced by a punching step performed by the pasting assembly 52 and incorporated in the drum pasting machine immediately prior to paste application; still, in other embodiments the punching step could be a stand-alone process carried out upstream of paste application. With particular reference to FIGS. 6 and 8, the drum 54 is implemented as a rotary punch 72. The rotary punch 72 has multiple cogs 74 or protuberances, projecting radially-outwardly from its exterior surface. The cogs 74 establish the throughholes 70 in the strip 24 and thus are patterned and spaced in a similar manner. At a location opposite the paste hopper 56, a second drum 76 interacts with the rotary punch 72 in order to produce the throughholes 70. The second drum 76 has multiple openings 78 that act as counterparts to the cogs 74. When the rotary punch 72 and second drum 76 rotate in unison, the openings 78 receive the cogs 74 in intermeshing engagement. Punched scrap of substrate material are thrust into an interior 80 of the second drum 76. From there, the punched scrap escapes the interior 80 by way of an exit 82 (FIG. 9) that is selectively vacuumized. The exit 82 can be equipped in an axial end wall 83 of the second drum 76. The punched scrap is sucked through the exit 82 upon activation of the vacuum. The vacuum can also serve to draw the punched scrap away from the openings 78 at the time of being punched.

Furthermore, the rotary punch 72 furnishes additional functionality that makes the incorporation of the punching step with paste application desirable in certain embodiments. Since individual cogs 74 remain inserted in individual throughholes 70 amid paste application at the paste hopper 56, the cogs 74 serve to mask the throughholes 70 from active paste material dispensed from the paste hopper 56. Active paste material is thereby precluded from being applied in the throughholes 70, where active paste material is unwanted. In addition, the inserted cogs 74 serve to provide traction between the rotary punch 72 and the strip 24 that assists advanced conveyance of the strip 24 beneath the paste hopper 56. Stretching, tearing, and other harm to the strip 24, which could ensue due to the fragility of certain substrate material, is more readily averted or altogether prevented. Moreover, the incorporation of the punching step with paste application minimizes the overall machine footprint in the larger production facility, compared to having a discrete punching installation separate from paste application.

The steps of applying active paste material set forth thus far will apply active paste material as a largely continuous longitudinal layer on the strip 24, absent the folding and masking steps described below. An uninterrupted lateral extent or area that is free of active paste material across the strip 24 is not intended to be produced in the above embodiments, as the pasting application and strip 24 are continuously run. The step of cutting the strip 24 into multiple individual substrates 26, according to some embodiments, therefore involves cutting directly through a lateral section of the applied active paste material while the active paste material is in the wet state and with the exterior surface 27 directly exposed to cutting. Without an active drying process and without a non-stick barrier overlayed on the exterior surface 27—both of which are omitted in certain embodiments due to placement of the current collector bodies 12, as previously described—it has been shown that wet active paste material can accumulate and build-up on cutting blade surfaces. Paste build-up can hamper efficient and effective cutting.

Accordingly, embodiments of the step of cutting the strip 24 that are presented in FIGS. 10-18 inhibit or altogether preclude paste material build-up on cutting blades, or otherwise effectively cope with such circumstances, providing a cutting step that can be readily employed in mass production. With reference to FIGS. 10-12A, the strip 24 is cut into multiple individual substrates 26 for subsequent processing via a crush cutting procedure. The crush cutting procedure is executed immediately downstream of paste application, and may be without any intervening steps or processing, per an embodiment. The applied active paste material is in its wet state at the time of cutting, and the exterior surface 27 is directly exposed to cutting without a non-stick barrier thereon. Further, the step of placing the cut substrates 26 with the current collector bodies 12 may be performed immediately downstream of cutting, and may be without any intervening steps or processing except for the optional spraying and misting for supplemental moisture content, as described.

An embodiment of a crush cutter assembly 84 is presented in FIGS. 10-12A. In general, the crush cutter assembly 84 includes a cutter head 86 and an anvil 88. The cutter head 86 and anvil 88 work together to fully sever lateral sections of the strip 24 and the active paste material carried thereon in a continuous manner. The severed lateral sections are distanced from one another in the longitudinal direction. The cutter head 86 and anvil 88 are driven for synchronized rotational movement. One or more cutter motors can drive rotation of the cutter head 86, of the anvil 88, or of both. An interconnection of pulleys, belts, chains, gears, and components similar in kind can transmit rotation between the cutter head 86 and anvil 88. The cutter head 86 is journaled for rotation about a main shaft 90. The anvil 88 is similarly journaled for rotation.

In order to effect severing, the cutter head 86 has multiple blades 92 interchangeably secured in a main body 94 with cutting edges equally circumferentially spaced apart around the main body 94. The blades 92 are composed of a metal material such as a hardened tool steel. Each of the blades 92 is directed radially outwardly and projects with a cutting edge 96 beyond an outermost surface 98 of the main body 94. Further, each of the blades 92 spans laterally across the main body 94 for a lateral extent at least equal to a lateral extent of the strip 24. To inhibit or altogether preclude paste material build-up on the blades 92 and on the cutting edge 96, a coating 100 (FIG. 12A) is layered on an exterior surface 102 of the blades 92. The coating 100 is provided at the cutting edge 96 and elsewhere on the exterior surface 102 that may come into contact with wet active paste material. The coating 100 can take different forms in different embodiments. Whatever its constituents, the coating 100 can exhibit one or more of the following characteristics relative to the base metal material of the blades 92: low coefficient of friction, nonstick, increased durability, and/or abrasion resistance. The coating 100 can be composed of a polytetrafluoroethylene (PTFE) material or a titanium nitride (TiN) material, to name but a couple of examples. Still, the crush cutter assembly could have various designs, constructions, and components in other embodiments.

Referring now to FIGS. 13-18, the strip 24 is cut into multiple individual substrates 26 according to another embodiment via an ultrasonic cutting procedure. Like the crush cutting procedure, the ultrasonic cutting procedure may be executed immediately downstream of paste application, and may be without any intervening steps or processing, per an embodiment. The applied active paste material is in its wet state at the time of cutting, and the exterior surface 27 is directly exposed to cutting and lacks a nonstick barrier thereon. Further, the step of placing the cut substrates 26 with the current collector bodies 12 may be performed immediately downstream of cutting, and may be without any intervening steps or processing except for the optional spraying and misting for supplemental moisture content, as described.

Figure 14:
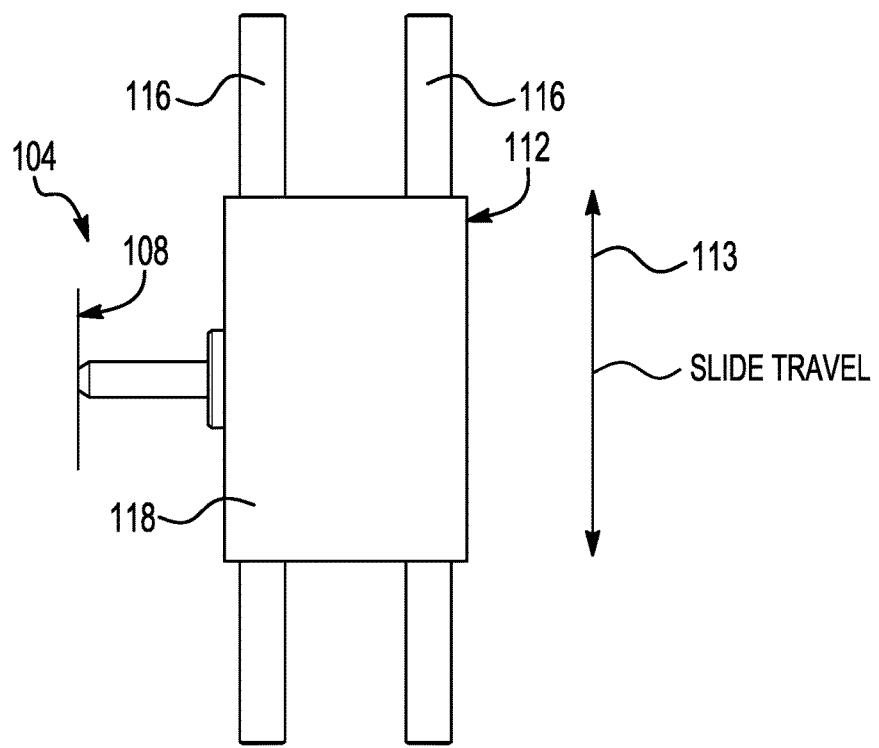
FIG. 14 is a top view of the ultrasonic cutter assembly, depicting a sliding mechanism thereof.
Figure 15:
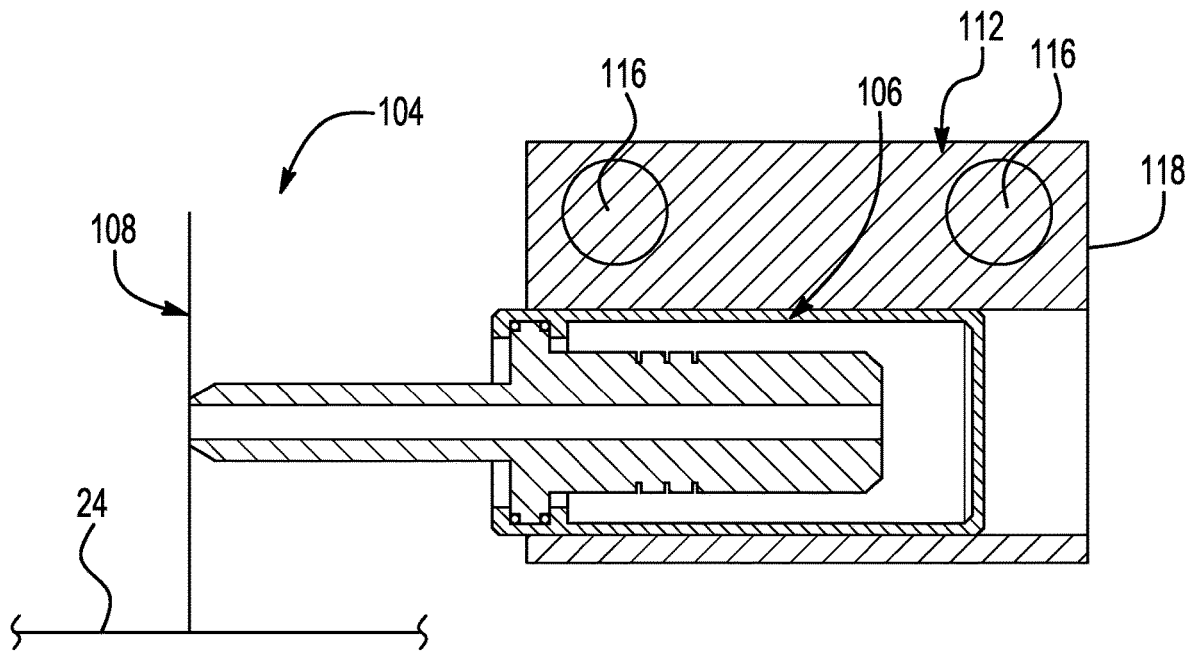
FIG. 15 is a sectional view of the sliding mechanism.

An embodiment of an ultrasonic cutter assembly 104 is presented in FIGS. 13-17. In general, the ultrasonic cutter assembly 104 includes a main assembly 106 and a blade 108. The main assembly 106 induces vibratory motion at the blade 108 in order to effect ultrasonic cutting of the strip 24 and the active paste material carried thereon. To automate transverse movement of the ultrasonic cutter assembly 104 for fully severing lateral sections of the pasted strip 24, the main assembly 106 can be equipped on a robot arm attachment 110 (FIG. 13), on a sliding mechanism 112 (FIGS. 14 and 15), or with some other device that moves the blade 108 transversely, for example. Movement of the ultrasonic cutter assembly 104 can be effected via servomotors. The robot arm attachment 110, sliding mechanism 112, or other transverse-movement device can situate the blade 108 at a horizontal side or vertically above the pasted strip 24 and in a position ready to carry out the cutting action. The blade 108 can be positioned in general confrontation with the exterior surface 27. The robot arm attachment 110 is mounted to a larger robotic tool that moves the ultrasonic cutter assembly 104 transversely from one lateral side of the pasted strip 24 to the other lateral side in an intermittent manner. The sliding mechanism 112 similarly moves the ultrasonic cutter assembly 104 transversely back and forth. Transverse movement is represented in FIG. 14 by arrowed line 113. The sliding mechanism 112 can have various configurations. In the example of FIGS. 14 and 15, the sliding mechanism 112 imparts linear movement over a pair of rails 116. Movement can be actuated by way of a servomotor, a ball-screw actuator, or some other type of linear actuator, for instance. The main assembly 106 is held in a carrier 118 of the sliding mechanism 112. In these embodiments, for uninterrupted conveyance of the pasted strip 24, the ultrasonic cutter assembly 104 can be further moved longitudinally with movement of the pasted strip 24 while cutting is performed concurrently in the transverse direction. Longitudinal movement is represented in FIG. 16 by arrowed line 115. Movement speed of the ultrasonic cutter assembly 104 and of the pasted strip 24 in the longitudinal direction can correspond so that there is no relative longitudinal movement between them while the transverse cutting movement occurs. Longitudinal movement of the ultrasonic cutter assembly 104 and of the pasted strip 24 can be at the same rate and speed. In other words, longitudinal conveyance of the pasted strip 24 need not cease or halt in order to perform cutting of the pasted strip 24 by the ultrasonic cutter assembly 104. In this way, the ultrasonic cutting procedure is more seamlessly incorporated into the larger process.

With particular reference now to FIG. 16, in this embodiment the main assembly 106 is configured as a Langevin piezoelectric transducer. The main assembly 106 generally has a body 120, a back mass 122, a piezoelectric stack 124, and a horn 126. A first bolt 128 is fastened at the back mass 122, while a second bolt 130 fastens the blade 108 to the horn 126. The piezoelectric stack 124 serves as a transducer and induces vibratory motion at the horn 126 and, in turn, vibratory motion is induced at the blade 108. In an example, the transducer exhibits a frequency of 35 kilohertz (kHz) and the blade 108 oscillates at 20 kHz or more. A power supply is variable up to 1,000 watts (W). The resulting oscillation can cause a mid-section booster (1:1) amplification to move approximately 10 micrometers (μm) in a longitudinal direction. The blade 108 may experience movement due to its oscillation; such movement could be approximately 20 μm, in an example, or could be more or less than this value. Still, other examples could have other working specifications. The blade 108 has a disk shape and can be in the form of a thin wafer disk. The disk shape is tuned to the natural harmonic frequency of the piezoelectric stack 124. As a cutting edge of the blade 108 wears with use over time, the disk shape can be revolved about the second bolt 130 to ready a fresh and unworn region of the cutting edge for use.

The blade 108 passes through applied paste material 29 during use, as shown in FIG. 17. To inhibit or altogether preclude paste material build-up on the blade 108 and on the horn 126, a coating can be applied to an exterior surface of the blade 108 as well as at areas of the horn 126 that may come into contact with wet active paste material. As before, the coating can take different forms in different embodiments and can exhibit one or more of the following characteristics: low coefficient of friction, nonstick, increased durability, and/or abrasion resistance. The coating can be composed of a polytetrafluoroethylene (PTFE) material or a titanium nitride (TiN) material, to name but a couple of examples. Still, a coating at the blade 108 may be unnecessary due to the rapid vibration of the blade 108 amid cutting which can agitate and preclude paste material build-up entirely. The blade 108 exhibits a wave-like oscillation during use that works to shake off active paste material from the blade 108. A serpentine cutting action has been observed at the cutting edge of the blade 108, rather than a sawing action which has been shown to adversely affect a severed strip such as by balling-up fibrous material adjacent the cut edge thereof or otherwise leaving the cut edge in an undesired condition. Moreover, a largely insignificant degree of contact friction is generated at the blade's cutting edge since the cutting edge only momentarily touches the strip 24 subject to the cutting action. Still, the ultrasonic cutter assembly could have various designs, constructions, and components in other embodiments.

Figure 18:
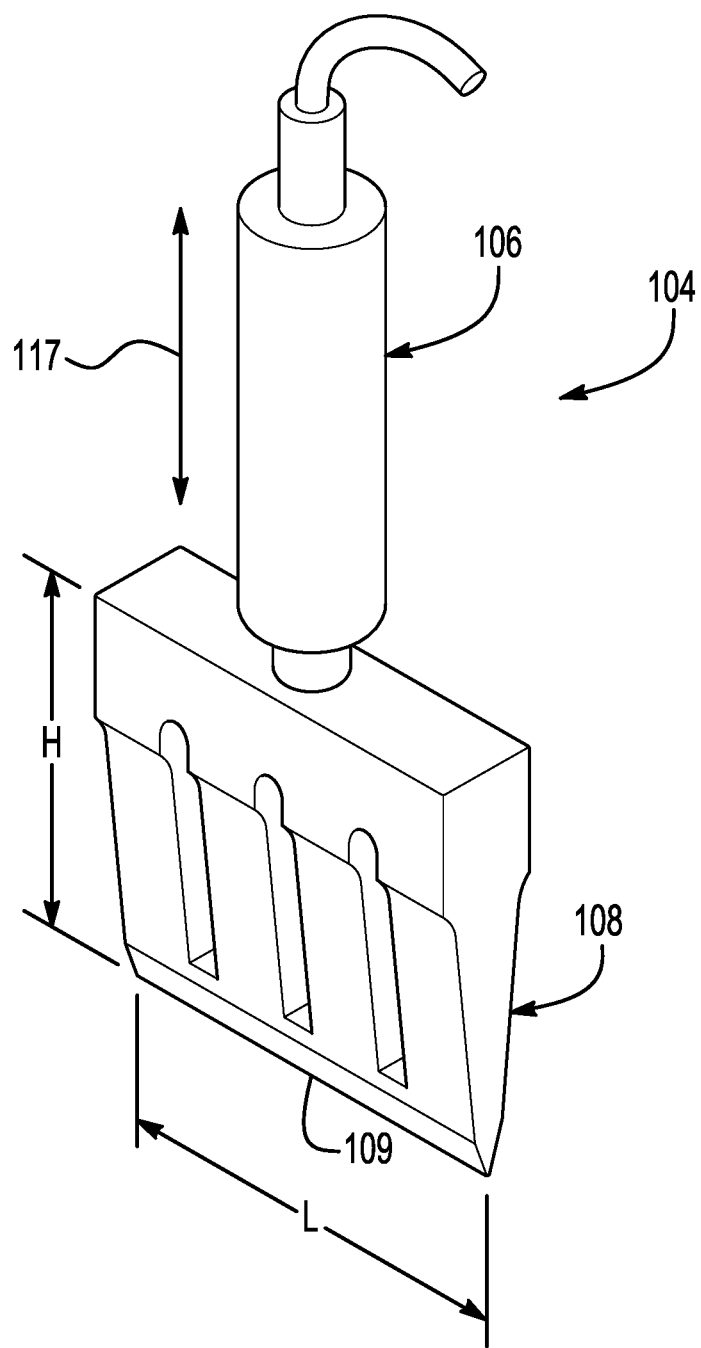
FIG. 18 is a perspective view of another embodiment of an ultrasonic cutter assembly.

With particular reference now to FIG. 18, another embodiment of the ultrasonic cutter assembly 104 is presented. As before, the ultrasonic cutter assembly 104 includes a main assembly 106 and a blade 108. A cutting edge 109 of the blade 108 initially encounters and passes through the applied paste material 29 during use of the ultrasonic cutter assembly 104. In an example, the blade 108 possesses a length dimension L of approximately one-hundred-and-thirty millimeters (130 mm) and a height dimension H of approximately eighty millimeters (80 mm); still, other dimensional values can be provided in other examples. Similar to the embodiment of FIGS. 13-16, the main assembly 106 of FIG. 18 can be configured as a Langevin piezoelectric transducer. Vibratory motion is induced at the blade 108. In an example, and as before, a frequency of 35 kilohertz (kHz) and a variable power supply of up to 1,000 watts (W) can be provided. Still, other examples could have other working specifications. Transverse movement of the ultrasonic cutter assembly 104 can be automated. A robot arm attachment, reciprocating mechanism, or some other movement device can be equipped with the ultrasonic cutter assembly 104. Unlike the embodiment of FIGS. 13-16, the ultrasonic cutter assembly 104 employs a guillotine-style cutting action amid its use. The ultrasonic cutter assembly 104 and its blade 108 are moved transversely and vertically up-and-down relative to the strip 24.

Vertical movement is represented in FIG. 18 by arrowed line 117. The blade 108 and cutting edge 109 confront the exterior surface 27 and initially encounter the applied paste material 29 from a location vertically above the exterior surface 27 as the blade 108 is brought down on the strip 24, according to an embodiment. In another embodiment, the blade 108 and cutting edge 109 can encounter and pass through the applied paste material 29 at a lateral angle relative to the strip 24, and not necessarily strictly vertically. As before, for uninterrupted conveyance of the pasted strip 24, the ultrasonic cutter assembly 104 of FIG. 18 can be moved longitudinally with movement of the pasted strip 24 while cutting is performed concurrently in the transverse and vertical direction. Movement speed of the ultrasonic cutter assembly 104 and of the pasted strip 24 in the longitudinal direction can correspond so that there is no relative longitudinal movement between them while the transverse and vertical cutting movement occurs. In this way, the ultrasonic cutting procedure is more seamlessly incorporated into the larger process. Furthermore, as before, a coating can be applied to an exterior surface of the blade 108 of FIG. 18 in order to inhibit or altogether preclude paste material build-up on the blade 108 during continued use.

Further, other equipment and assemblies can be employed to produce a lateral extent or area across the strip 24 that is free of active paste material. In this sense, active paste material will be applied at the strip 24 as a discontinuous longitudinal layer. Cutting directly through the applied active paste material while the active paste material is in its wet state can hence be altogether avoided. The crush cutting with coated blades and ultrasonic cutting then need not necessarily be performed, although could be carried out in certain embodiments. Instead, the step of cutting can be executed at the lateral extent that lacks active paste material. Since paste material build-up will not develop in these circumstances, the cutting step can be performed by the crush cutting procedure set forth, but with blades without the described coating. The cutting step could also be carried out in other ways, such as by a rotary cutter and by the cutter system and methods described in U.S. Pat. No. 10,232,453 by applicant Wirtz Manufacturing Company, Inc. with an issuance date of Mar. 19, 2019.

Equipment and assemblies are shown in FIGS. 19-27 that leave a lateral extent or area across the strip 24 free of active paste material. This serves as a preparation of sorts of the pasted strip 24 for subsequent cutting. In the embodiment of FIGS. 19-24, a pleating assembly 132 furnishes the paste-free lateral extent. The pleating assembly 132 can have various designs, constructions, and components in different embodiments. The pleating assembly 132 presented in the figures includes a carriage assembly 134 that is made-up of multiple carriages 136 arranged in succession to carry and transport the strip 24 through a pasting assembly and beneath a paste hopper, according to at least one example. The carriages 136 constitute segments of the carriage assembly 134 and span and move around an endless loop in full assembly and use. The carriages 136 can be made of a plastic or stainless-steel material. The strip 24 is laid, in part, atop of the carriages 136. A drive assembly 138 propels movement of the carriage assembly 134 and its carriages 136. In this embodiment, the drive assembly 138 includes a set of rollers 140 (only one shown), a chain 142, and a track 144. At least one of the rollers 140 can be driven to rotate by a motor that has an interconnection to the roller(s) 140 to transmit that rotation. Either of the rollers 140 can be idler rollers. The chain 142 is driven to move by the rollers 140 and, in turn, drives movement of the carriages 136. An interconnection could be furnished between the rollers 140 and chain 142 in order to facilitate driving. The chain 142 includes a pair of individual chain components on each side of the rollers 140 and on each side of the carriages 136. Each chain component has a series of dog protrusions 145 extending outboard of its elongated extent. The dog protrusions 145 are married with complementary slots 147 (FIG. 19) residing at an underside of each carriage 136. The slots 147 receive insertion of the dog protrusions 145. The track 144 and the path it provides for the carriages 136 are endless and have U-shaped turns at its ends (only one U-shaped turn shown in FIGS. 19, 20, and 21). The track 144 includes a pair of individual track components of each side of the rollers 140 and on each side of the carriages 136. Each track component has a channel 149 to pilot movement of the carriages 136. The channels 149 receive guides 151 of the carriages 136. The guides 151 project laterally on each side of the carriages 136 and ride in the channels 149. There are two guides 151 on each side of the carriages 136—one located frontward and one located rearward (best shown in FIG. 20). The guides 151 can be in various forms such as pins, rollers, wheels, or the like.

Figure 21:
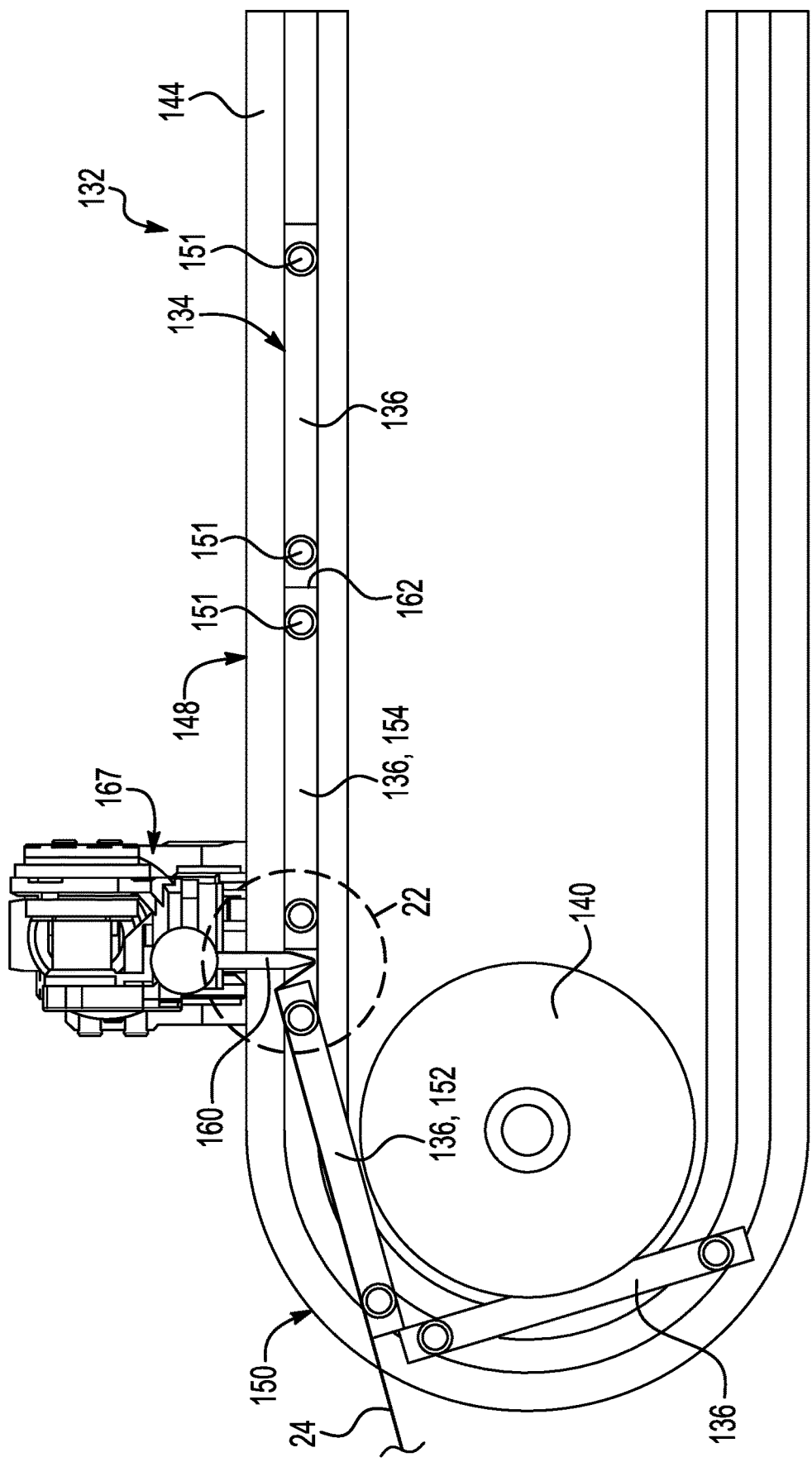
FIG. 21 is a side view of the pleating assembly.
Figure 22:
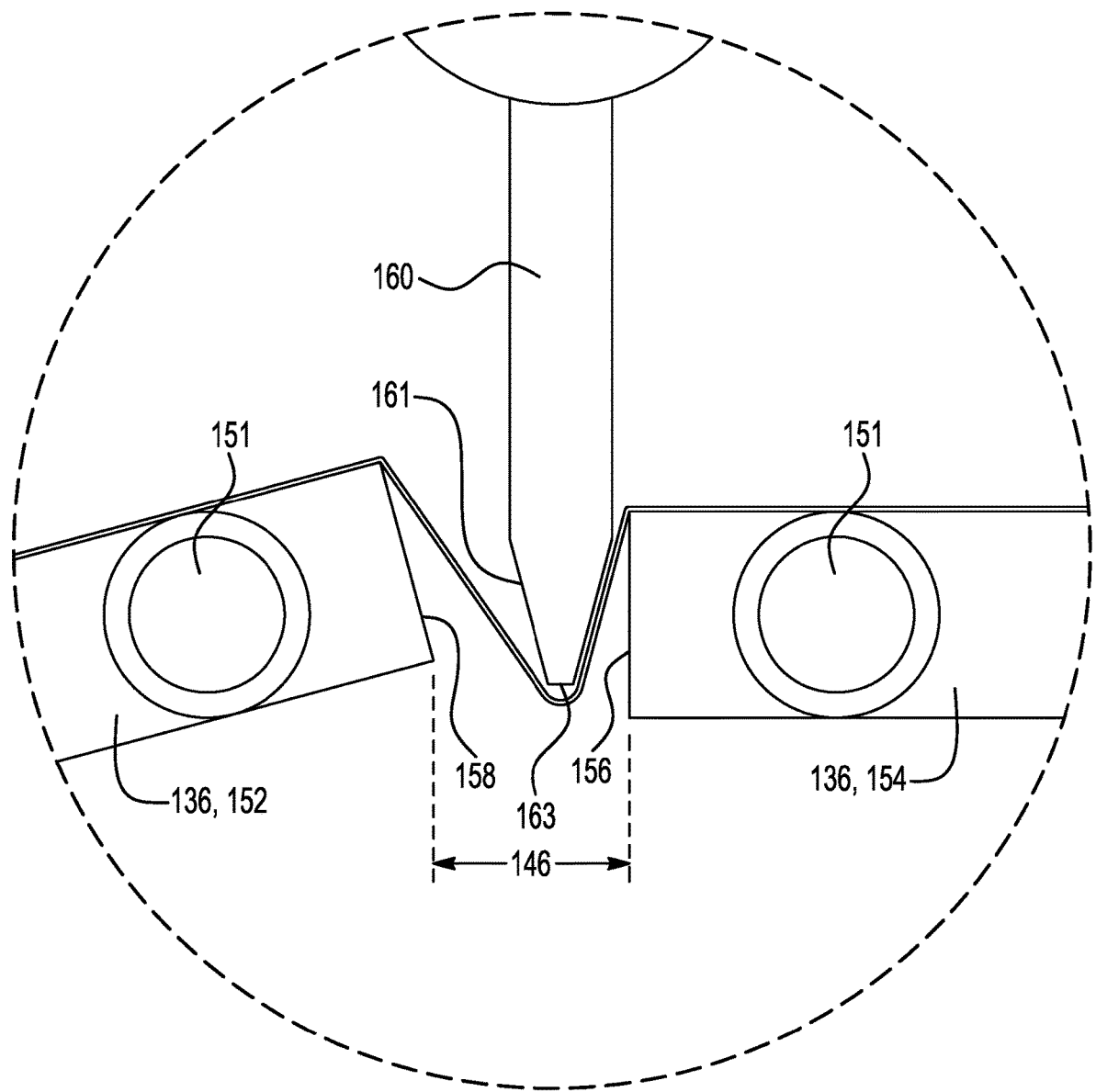
FIG. 22 is an enlarged view of the pleating assembly.

To provide the paste-free lateral extent, lateral sections of the strip 24 are folded prior to and during paste application, and then unfolded after pasting. The folding action conceals that section of the strip 24 from application of active paste material. In the pleating assembly 132, the folding and unfolding actions take place when a pair of consecutive carriages 136 separate from each other and an interstitial spacing 146 temporarily develops between them. With particular reference to FIGS. 21 and 22, the separation and resulting gap occur at a bend in the conveyor's path according to this embodiment. As the carriages 136 advance along a path 148 and over a bend 150—both established by the track 144—a following carriage 152 is tilted at a downward angle relative to a leading carriage 154 immediately preceding the following carriage 152. The tilting is effected about the guides 151 and as the guides 151 ride in the channels 149 of the track 144. The interstitial spacing 146 is momentarily established between a first surface 156 of the leading carriage 154 and a second surface 158 of the following carriage 152 as the surfaces come apart. The first and second surfaces 156, 158 confront each other across the interstitial spacing 146.

Figure 19:
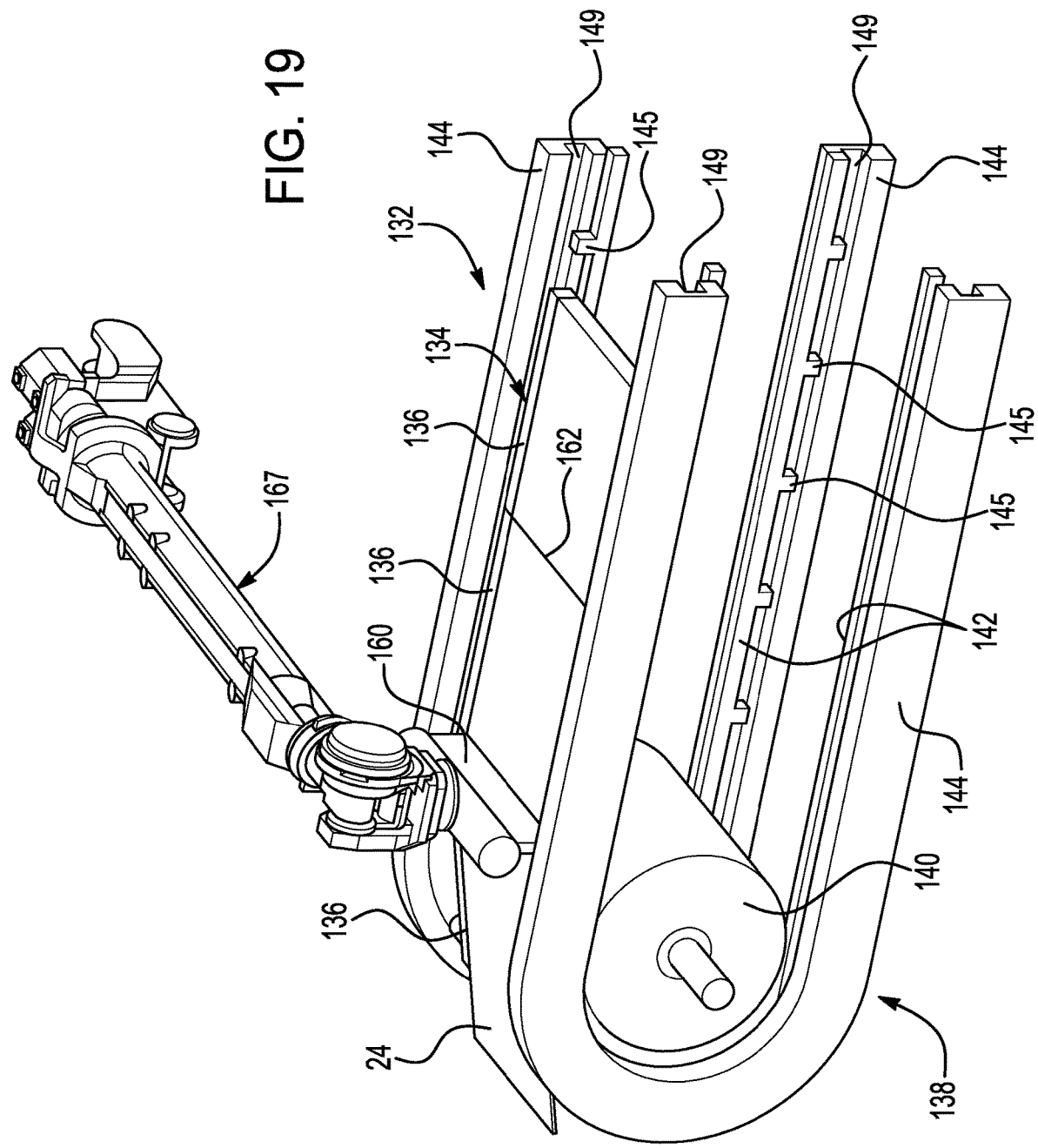
FIG. 19 is a perspective view of an embodiment of a pleating assembly.
Figure 20:
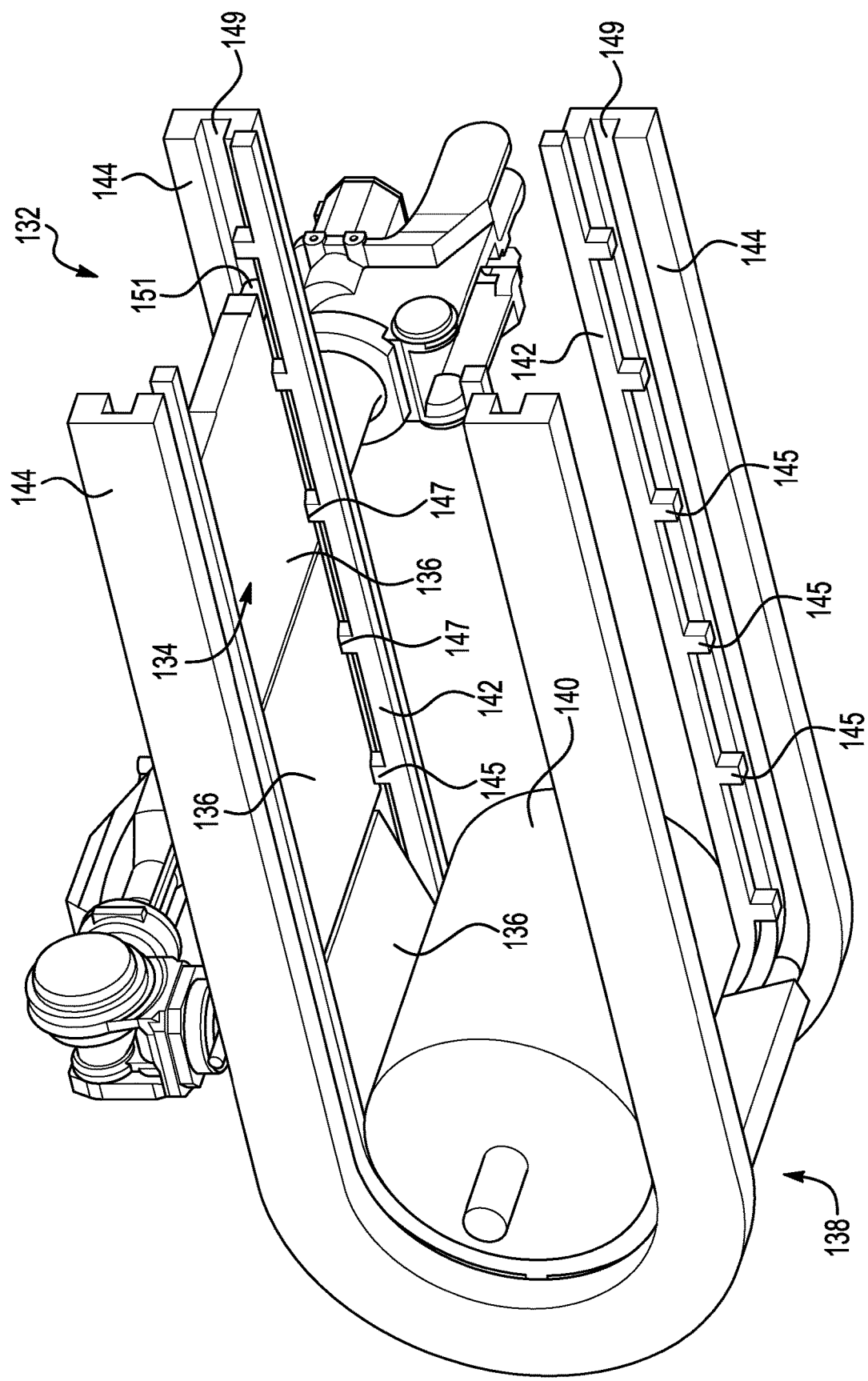
FIG. 20 is another perspective view of the pleating assembly.

A pleat bar 160 is brought down in contact with a section of the strip 24 that bridges the interstitial spacing 146 and spans between the following and leading carriages 152, 154. Movement of the pleat bar 160 can be effected via a servomotor or some other type of actuator. In the embodiment of FIGS. 19-21, the pleat bar 160 is mounted on a robotic arm 167. The robotic arm 167 can move vertically downward and upward with respect to the orientation of FIGS. 19-21, and can move in the forward and rearward longitudinal directions. The pleat bar 160 presses that section of the bridging strip 24 downward and into the interstitial spacing 146. The pressed lateral section remains intact and is not severed or otherwise harmed by the pleat bar 160. The pleat bar 160 can have a tapered end 161 with a blunted tip 163 for this purpose, as shown best in the enlarged view of FIG. 22. The pressed lateral section of the strip 24 is thereby inserted in the interstitial spacing 146 and in-between the leading and following carriages 154, 152. As the following and leading carriages 152, 154 move forward over the path 148, the first and second surfaces 156, 158 come back together in opposed abutment and the interstitial spacing 146 is closed. Before closing, the pleat bar 160 is retracted upward and away from the strip 24 and out of the interstitial spacing 146. The tapered end 161 facilitates retraction without interfering with the closing. The pressed lateral section of the strip 24, however, remains situated between the first and second surfaces 156, 158 after withdrawal of the pleat bar 160 and gets trapped therebetween. The trapped lateral section is a folded lateral section 162 with surfaces doubled-over each other and pressed between the first and second surfaces 156, 158. The folded lateral section 162 stays trapped by the leading and following carriages 154, 152 and moves forward with the carriages until it is unfolded downstream of paste application. Folded lateral sections 162 are established one-after-another between all consecutive carriages 136 of the carriage assembly 134.

With particular reference to FIGS. 23 and 24, the folded lateral sections 162 conceal those sections of the strip 24 from paste application, precluding active paste material from being dispensed thereto and leaving lateral areas across the strip 24 that have no paste material. The folding action occurs upstream of paste application. Paste application can be carried out via a paste hopper 153. The paste hopper 153 can be similar to that previously described with reference to FIG. 5. The carriage assembly 134 transports the strip 24 with the folded lateral sections 162 beneath the paste hopper 153. The folded lateral sections 162 travel with consecutive carriages 136 downstream and beneath the paste hopper 153. Because the folded lateral sections 162 are unexposed at the time of paste application, active paste material is not dispensed on them. After paste application, the folded lateral sections 162 are released one-after-another from the first and second surfaces 156, 158. The folded lateral sections 162 are unfolded, and a paste-free lateral extent 155 is revealed across the strip 24. The unfolding action can be carried out in various ways. In the embodiment of FIGS. 23 and 24, a conveyor 157 is situated downstream of paste application and the paste hopper 153, and downstream of the carriage assembly 134. The conveyor 157 can be an endless belt conveyor, and can run at a speed slightly higher than that of the carriage assembly 134. The folded lateral sections 162 are released at another bend 159 in the track 144. The bend 159 occurs downstream of paste application and downstream of the paste hopper 153. Although it lacks specific depiction, the bend 159 can mirror the bend 150. At the bend 159, the leading carriage 154 is tilted downward relative to the following carriage 152. The interstitial spacing 146 is again established and the trapped lateral section escapes the first and second surfaces 156, 158. The released section of the strip 24 is pulled forward by the conveyor 157. Momentary slack in the strip 24 at a gap 165 between the carriage assembly and conveyor 134, 157 is taken-up by the increased speed of the conveyor 157, bringing the strip 24 taut and revealing the paste-free lateral extents 155. Still, the unfolding action could be carried out via a loop configuration situated between the carriage assembly 134 and the conveyor 157 in which there is a large enough gap between the carriage assembly 134 and conveyor 157 to produce a controlled loop of strip 24 section therebetween and the suspended weight of the section serves to unfold itself before transitioning to the conveyor 157; in this example, the conveyor 157 need not run at the slightly higher speed, although could. Cutting can then be performed downstream at forward and rearward ends of the paste-free lateral extents 155. All of the described actions including the downward and upward movements of the pleat bar 160 and advancement of the carriages 136—are carried out as the strip 24 is conveyed in an uninterrupted manner. The pleat bar 160 moves longitudinally with movement of the conveyed strip 24. Movement speed of the pleat bar 160 and of the strip 24 in the longitudinal direction can correspond so that there is no relative longitudinal movement between them while the lateral sections are pressed.

The paste-free lateral extents 155 can be provided in yet additional ways. In the embodiment of FIGS. 25-28, a mask overlay assembly 164 provides the paste-free lateral extents 155 across the strip 24. The mask overlay assembly 164 can have various designs, constructions, and components in different embodiments. The mask overlay assembly 164 presented in the figures includes a series of mask overlay components 166 and a chain drive assembly 168. The mask overlay components 166 are laid atop the strip 24 and receive active paste material thereon in place of the covered strip sections. The mask overlay components 166 can be attached together in a string of components, or can be discrete individual parts as shown. After paste application, the mask overlay components 166 can be disposed or reused, depending on their form. The mask overlay components 166 can be single-use or multi-use. In one example the mask overlay components 166 are composed of stainless-steel material. To suitably shield the strip 24, the composition of the mask overlay components 166 is impervious to active paste material.

Figure 26:
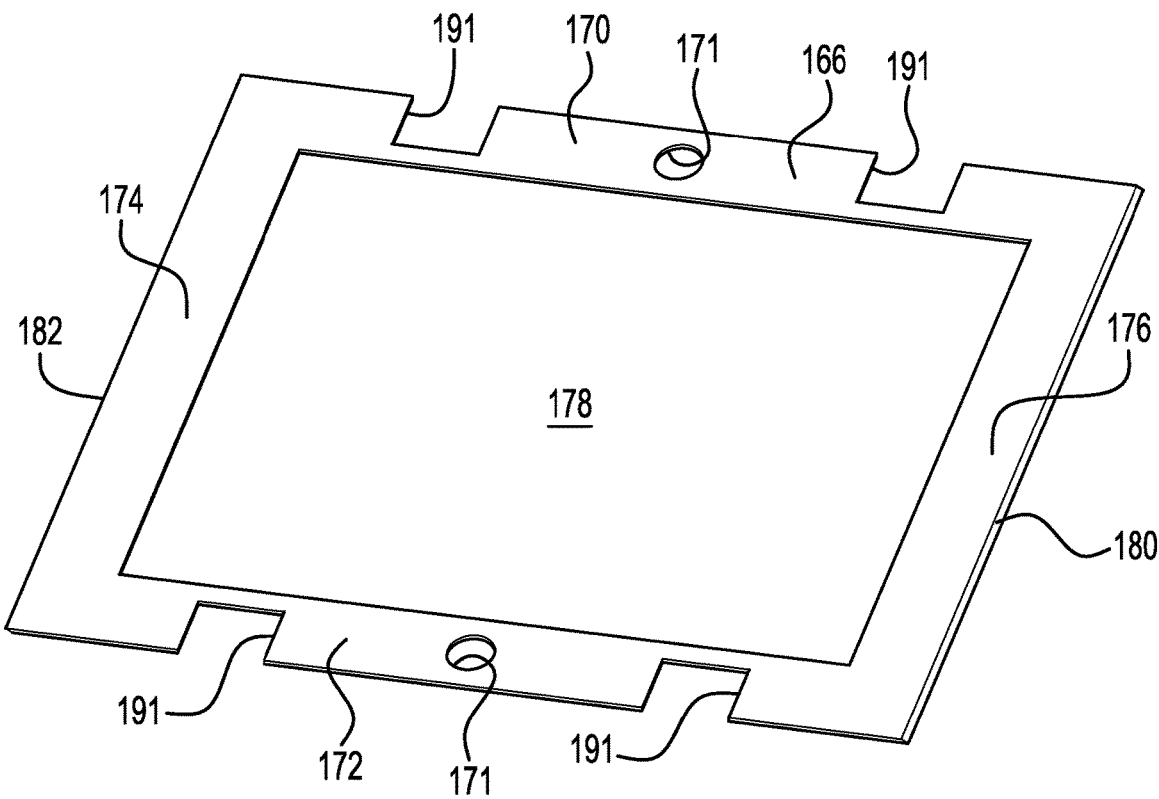
FIG. 26 is a perspective view of a mask overlay component of the mask overlay assembly.

With particular reference to FIG. 26, each mask overlay component 166 has a one-piece rectangular body with a first longitudinal portion 170, a second longitudinal portion 172, a first transverse portion 174, and a second transverse portion 176. A window 178 is defined by, and resides within, the portions 170, 172, 174, 176. Active paste material is dispensed through the window 178 and onto the exposed section of the strip 24 thereat. The window 178 has a side-by-side lateral width that may be approximately the same as a lateral width of the elongate substrate 24 so that active paste material is applied wholly across the strip 24. The first and second transverse portions 174, 176 receive active paste material on their upper faces that would otherwise be applied to the substrate's lateral extents covered underneath. The transverse portions 174, 176 span fully across the strip 24 in the lateral direction. Paste application is blocked from the strip's lateral extents that are shielded by the first and second transverse portions 174, 176. Upon removal of the mask overlay components 166, paste-free lateral extents at the strip 24 are revealed underneath. To facilitate removal of the mask overlay components 166 after pasting, a trailing edge 182 of each mask overlay components 166 may be angled forward at an acute included angle to underlie a complementary angled leading edge 180 of an immediately succeeding mask overlay component 166 so that lifting the leading mask overlay component from the strip 24 also lifts or raises the leading edge of the immediately succeeding mask overlay component so that it can be readily engaged for removal from the underlying strip 24.

Figure 25:
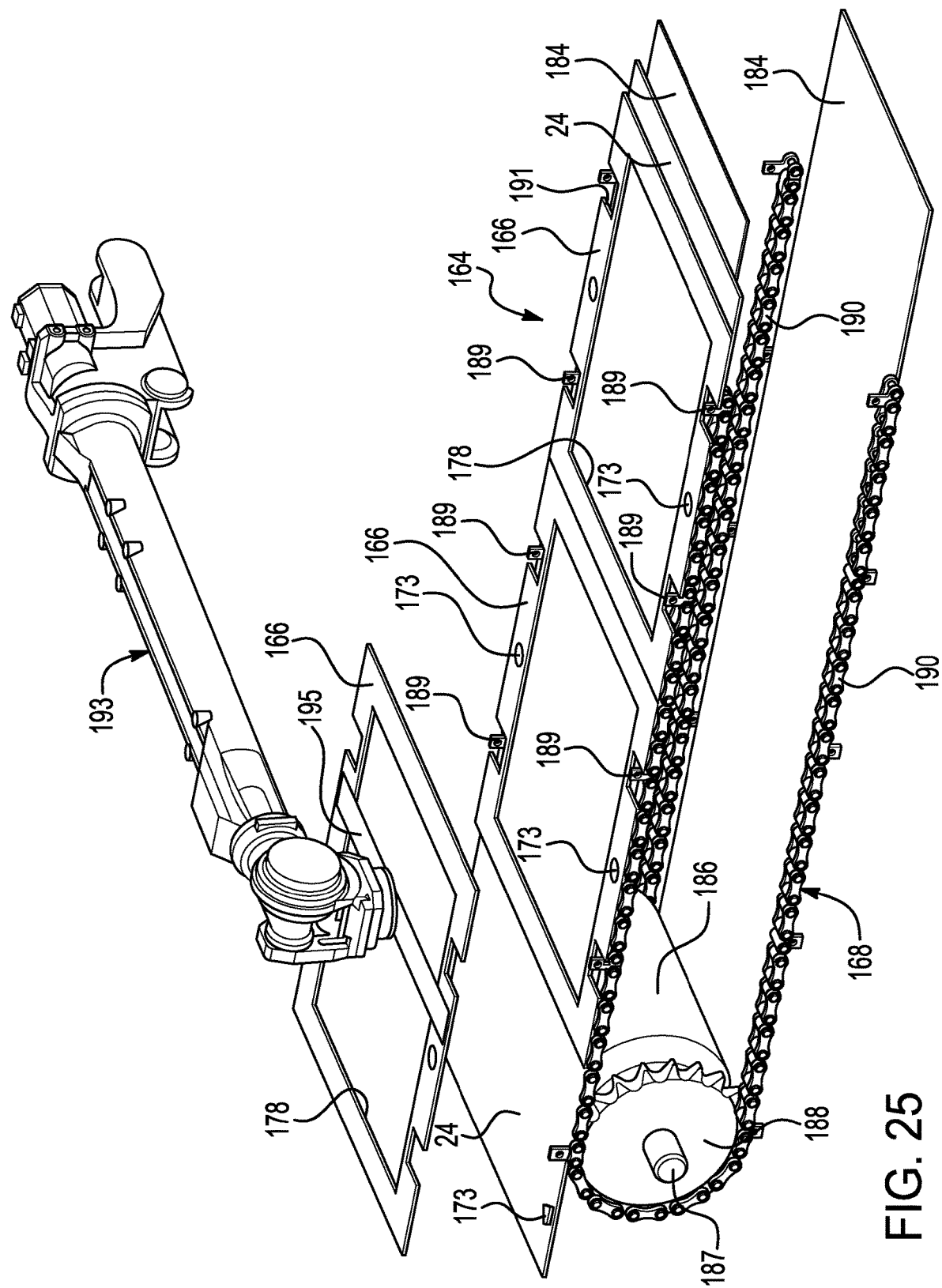
FIG. 25 is a perspective view of an embodiment of a mask overlay assembly.

With reference to FIG. 25, the chain drive assembly 168 locates the mask overlay assembly 164 with respect to a belt 184, and propels movement of the mask overlay assembly 164 at the belt 184. The belt 184 is driven to run by a set of rollers 186 (only one shown). The strip 24 is conveyed on the belt 184. In this embodiment, the chain drive assembly 168 includes a set of gears 188 (only one shown) and a pair of chains 190. The gear 188 is mounted on an axle 187 of the roller 186 so that co-rotation is effected between the roller 186 and the gear 188. The belt 184 and chains 190 move at the same speed. A motor can have an interconnection with the axle 187 in order to transmit rotation to the roller 186 and to the gear 188. In order to synchronize movement between the mask overlay assembly 164 and the strip 24, the chains 190 are toothed with keys 189 or dogs that project outboard and are received in keyways 191 or slots residing at the first and second longitudinal portions 170, 172. Furthermore, to locate the mask overlay components 166 with respect to the belt 184, the mask overlay components 166 have openings 171 that receive protrusions 173 of the belt 184. The protrusions 173 project upward from the belt 184. In use, the mask overlay assembly 164 and its components 166 are brought over the strip 24 upstream of paste application. The mask overlay assembly 164 and components 166 can be put in place in various ways in different embodiments. In the embodiment of FIG. 25, a robotic arm 193 picks up individual mask overlay components 166 and places the components 166 over the strip 24. The keys 189 and keyways 191 can be approximately lined-up for insertion/reception upon placement, as well as the openings 171 and protrusions 173. A suitable end effector 195 grabs, carries, and delivers the mask overlay components 166. Subsequently, the chain drive assembly 168 urges movement of the mask overlay assembly 164 with the strip 24 through and beneath a paste hopper, according to an example. After paste application, the mask overlay assembly 164 is removed from the strip 24. Removal can be effected via a robotic arm and end effector. Cutting can then be performed downstream at forward and rearward ends of the resulting paste-free lateral extents. All of the described actions—including bringing and removing the mask overlay assembly 164—may be carried out in an uninterrupted manner.

Figure 27:
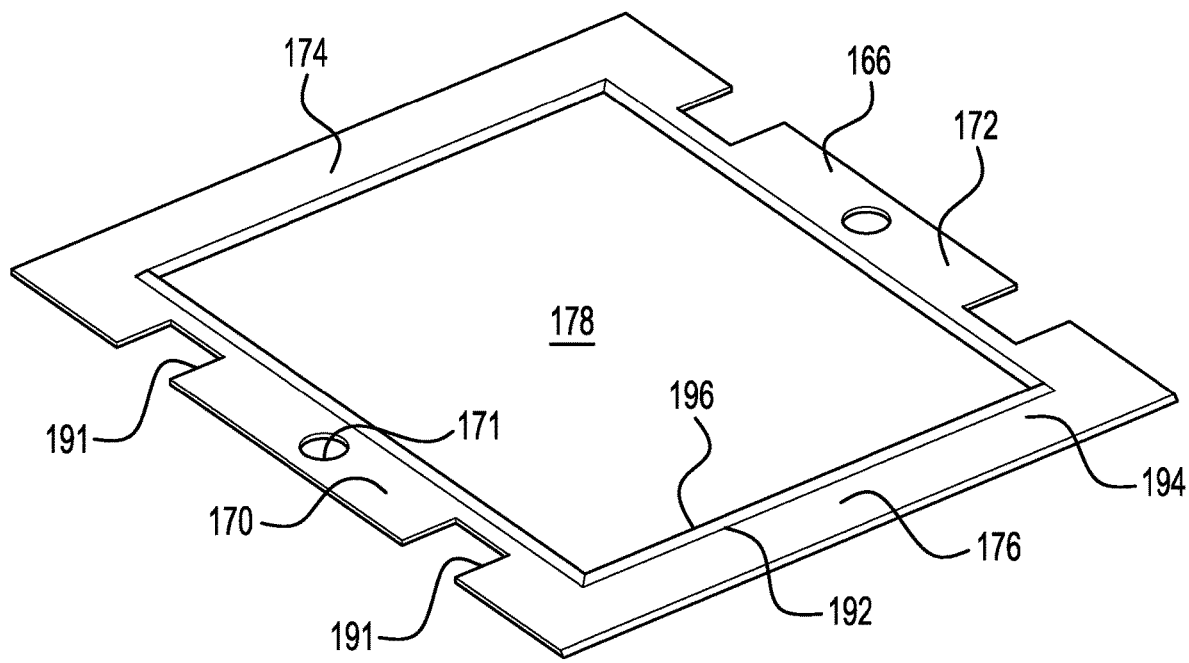
FIG. 27 is a bottom view of an embodiment of a mask overlay component with a blade.
Figure 28:
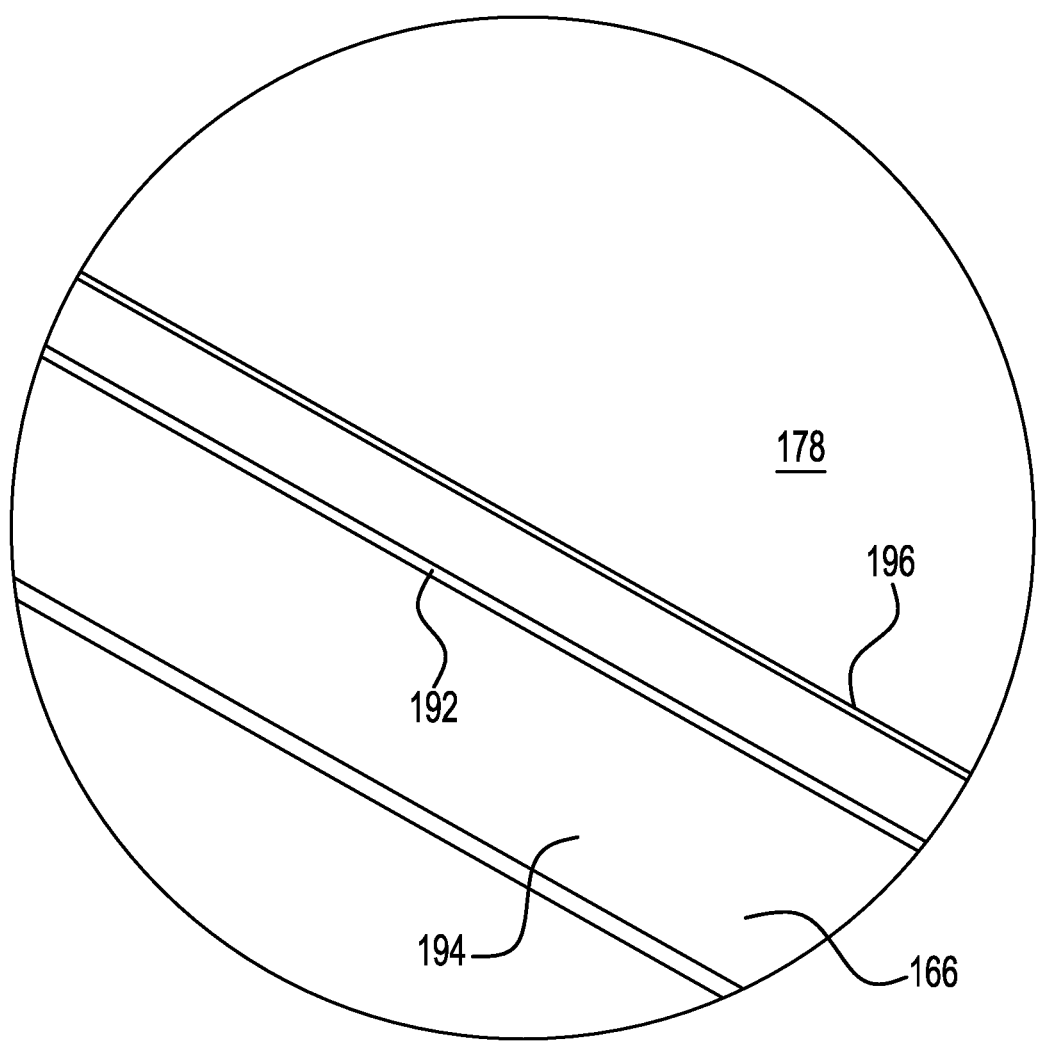
FIG. 28 is an enlarged view of the blade of the mask overlay component of FIG. 27.

In an alternative embodiment of the mask overlay assembly 164, the step of cutting the strip 24 is incorporated into the masking procedure. With reference now to FIGS. 27 and 28, each of the mask overlay components 166 has a blade 192 protruding downward from an underside 194 thereof. The blade 192 spans continuously around a perimeter of the window 178, and is set back slightly from an inside edge 196 of the window 178. When the mask overlay assembly 164 and its components 166 are brought atop the strip 24, the blade 192 makes opposed abutment with the strip 24. The mask overlay assembly 164 and the strip 24 can be run through one or more rollers that impart a suitable load to cut the strip via the blade 192. The load can be imparted upstream of paste application.

Figure 2:
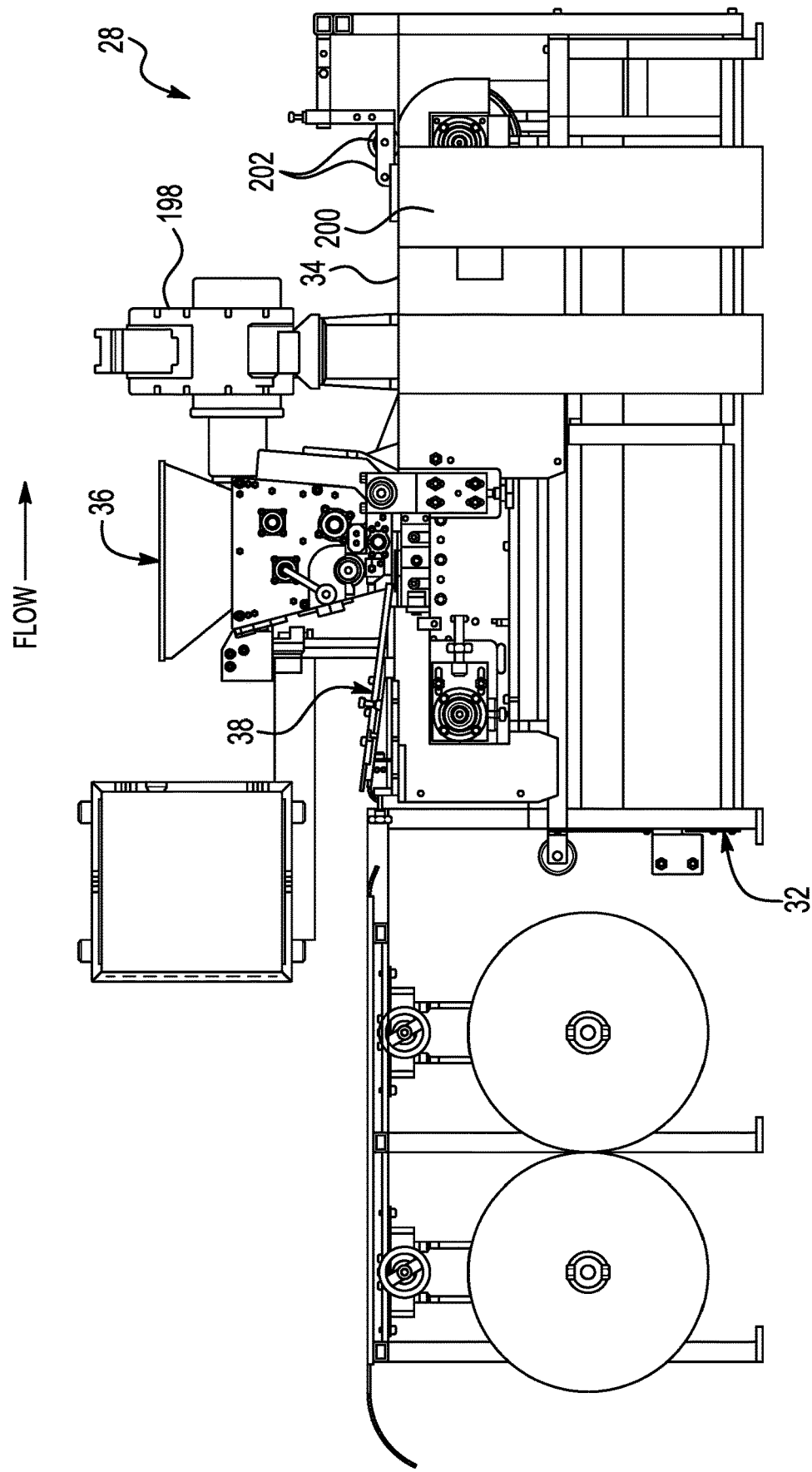
FIG. 2 is a side view of an embodiment of equipment employed to make pasted substrates and to place current collectors thereon.

Lastly, the current collector bodies 12 are put in place on top of the substrates 26 while the applied active paste material is in the wet state. Placement can be performed in various ways in different embodiments. In the embodiment of FIGS. 2-4, a robotic arm 198 picks up current collector bodies 12 from a current collector body stack 200 and lays the current collector bodies 12 individually or in multiples on top of the pasted substrates 26. The robotic arm 198 is equipped with a suitable end effector for carrying and delivering the current collector bodies 12. The belt 34 conveys the placed current collector bodies 12 and pasted substrates 26 now sandwiched together—beneath a pair of successive rollers 202 to help ensure proper adhesion and bonding therebetween. Downstream of the rollers 202, the pasted current collectors 10 can be stacked for subsequent processing.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of making pasted substrates for use in bipolar batteries, the method comprising:
    applying paste material to an elongate strip of substrate material;
    cutting said elongate strip of substrate material into multiple individual substrates; and
    placing current collector bodies on said pasted substrates downstream of said applying paste material to said elongate strip of substrate material and while said paste material is in a wet state.

2. The method of making pasted substrates for use in bipolar batteries as set forth in claim 1, further comprising bringing said placed current collector bodies and pasted substrates for engagement with at least one roller downstream of said placing current collector bodies on said pasted substrates.

3. The method of making pasted substrates for use in bipolar batteries as set forth in claim 1, wherein said elongate strip of substrate material, once pasted, lacks a barrier material at an exterior surface of said pasted elongate strip of substrate material immediately exposed to said cutting.

4. The method of making pasted substrates for use in bipolar batteries as set forth in claim 1, further comprising punching said elongate strip of substrate material to have a plurality of throughholes prior to said applying paste material to said elongate strip of substrate material.

5. The method of making pasted substrates for use in bipolar batteries as set forth in claim 4, wherein said punching is carried out via a rotary punch having a plurality of cogs, said plurality of cogs establishing said plurality of throughholes, said rotary punch situated beneath a paste hopper.

6. The method of making pasted substrates for use in bipolar batteries as set forth in claim 5, wherein said plurality of cogs serves to mask said plurality of throughholes amid said applying paste material to said elongate strip of substrate material, precluding application of paste material in said plurality of throughholes.

7. The method of making pasted substrates for use in bipolar batteries as set forth in claim 5, wherein said plurality of cogs serves to assist advancing said elongate strip of substrate material beneath said paste hopper amid said applying paste material to said elongate strip of substrate material once said plurality of throughholes are established in said elongate strip of substrate material.

8. The method of making pasted substrates for use in bipolar batteries as set forth in claim 1, wherein said cutting said elongate strip of substrate material involves crush cutting said elongate strip of substrate material, once pasted, into said multiple individual substrates, said crush cutting is carried out via blades brought into contact with said paste material in a wet state.

9. The method of making pasted substrates for use in bipolar batteries as set forth in claim 8, wherein said blades have a coating thereon that inhibits adherence of said paste material to said blades.

10. The method of making pasted substrates for use in bipolar batteries as set forth in claim 1, wherein said cutting said elongate strip of substrate material involves ultrasonic cutting said elongate strip of substrate material, once pasted, into said multiple individual substrates.

11. The method of making pasted substrates for use in bipolar batteries as set forth in claim 10, wherein said ultrasonic cutting uses an ultrasonic cutter assembly, said ultrasonic cutter assembly comprises a blade, said blade moves substantially orthogonal amid a cutting action of said elongate strip of substrate material with respect to a longitudinal direction of travel of said elongate strip of substrate material.

12. The method of making pasted substrates for use in bipolar batteries as set forth in claim 11, wherein said blade moves in the longitudinal direction amid cutting said elongate strip of substrate material, and the movement of said blade in the longitudinal direction substantially corresponds to longitudinal movement of said elongate strip of substrate material.

13. The method of making pasted substrates for use in bipolar batteries as set forth in claim 1, further comprising:
    using an ultrasonic cutter assembly to cut said elongate strip of substrate material into said multiple individual substrates, said ultrasonic cutter assembly comprising a blade; and
    moving said blade amid a cutting action substantially transversely to a longitudinal direction of movement of said elongate strip of substrate material, and concurrently moving said blade in the longitudinal direction with the longitudinal movement of said elongate strip of substrate material amid the cutting action.

14. The method of making pasted substrates for use in bipolar batteries as set forth in claim 1, further comprising folding lateral sections of said elongate strip of substrate material prior to said applying paste material to said elongate strip of substrate material, said folded lateral sections concealed from application of said paste material amid said applying paste material to said elongate strip of substrate material.

15. The method of making pasted substrates for use in bipolar batteries as set forth in claim 14, further comprising unfolding said folded lateral sections after said applying paste material to said elongate strip of substrate material, wherein said cutting said elongate strip of substrate material involves cutting said elongate strip of substrate material at said unfolded lateral sections.

16. The method of making pasted substrates for use in bipolar batteries as set forth in claim 1, further comprising bringing at least one mask overlay atop said elongate strip of substrate material prior to said applying paste material to said elongate strip of substrate material, said at least one mask overlay concealing lateral sections of said elongate strip of substrate material from application of said paste material amid said applying paste material to said elongate strip of substrate material, and wherein said cutting said elongate strip of substrate material involves cutting said elongate strip of substrate material at said lateral sections of said elongate strip of substrate material.

17. The method of making pasted substrates for use in bipolar batteries as set forth in claim 16, further comprising removing said at least one mask overlay from said elongate strip of substrate material prior to said cutting said elongate strip of substrate material into multiple individual substrates.

18. A method of making pasted substrates for use in bipolar batteries, the method comprising:
    applying paste material to an elongate strip of substrate material;
    ultrasonic cutting said elongate strip of substrate material at said applied paste material while said applied paste material is in a wet state, wherein said ultrasonic cutting uses an ultrasonic cutter assembly having a blade, said blade severing said elongate strip of substrate material at said applied paste material while said applied paste material is in the wet state; and
    moving said blade during said ultrasonic cutting in a direction substantially transverse to a longitudinal direction of movement of said elongate strip of substrate material, and concurrently moving said blade in the longitudinal direction with the longitudinal movement of said elongate strip of substrate material during said ultrasonic cutting.

19. A method of making pasted substrates for use in bipolar batteries, the method comprising:
    folding lateral sections of an elongate strip of substrate material;
    applying paste material to said elongate strip of substrate material, said folded lateral sections of said elongate strip of substrate material concealed from application of said paste material;
    unfolding said folded lateral sections of said elongate strip of substrate material; and
    cutting said elongate strip of substrate material at said unfolded lateral sections.

20. The method of making pasted substrates for use in bipolar batteries as set forth in claim 19, further comprising:
    establishing an interstitial spacing between a leading carriage and a following carriage of a carriage assembly, said carriage assembly carrying said elongate strip of substrate material; and
    engaging said elongate strip of substrate material at said interstitial spacing via a pleat bar in order to effect said folding of said lateral sections of said elongate strip of substrate material.

* * * * *